(12) United States Patent
Maughan et al.

(10) Patent No.: US 10,620,603 B2
(45) Date of Patent: **\*Apr. 14, 2020**

(54) METHOD AND APPARATUS FOR MONITORING AND TROUBLESHOOTING OF HVAC EQUIPMENT

(71) Applicant: Shield Air Solutions, Inc., Houston, TX (US)

(72) Inventors: Steve Maughan, Hooper, UT (US); Barry C. Loder, Houston, TX (US); Wei Fung, Houston, TX (US); Daniel Hale, Houston, TX (US); William J. Riter, Houston, TX (US)

(73) Assignee: Shield Air Solutions, Inc., Houston, TX (US)

( \* ) Notice: Subject to any disclaimer, the term of this patent is extended or adjusted under 35 U.S.C. 154(b) by 0 days.

This patent is subject to a terminal disclaimer.

(21) Appl. No.: 16/248,879

(22) Filed: Jan. 16, 2019

(65) Prior Publication Data

US 2019/0146449 A1    May 16, 2019

Related U.S. Application Data

(63) Continuation of application No. 14/879,322, filed on Oct. 9, 2015, now Pat. No. 10,203,676.
(Continued)

(51) Int. Cl.
*G05B 13/00* (2006.01)
*G05B 19/042* (2006.01)
(Continued)

(52) U.S. Cl.
CPC .......... *G05B 19/0428* (2013.01); *F24F 11/00* (2013.01); *F24F 11/30* (2018.01); *F24F 11/62* (2018.01); *F24F 2110/00* (2018.01)

(58) Field of Classification Search
CPC .................................................. F24F 11/0086
(Continued)

(56) References Cited

U.S. PATENT DOCUMENTS

| 5,481,481 A | * | 1/1996 | Frey .............. G05B 19/0421 |
| | | | 340/3.1 |
| 2010/0025483 A1 | * | 2/2010 | Hoeynck .............. H02J 3/14 |
| | | | 236/1 C |

(Continued)

OTHER PUBLICATIONS

Namburu, Setu Madhavi, et al. "Data-driven modeling, fault diagnosis and optimal sensor selection for HVAC chillers." IEEE transactions on automation science and engineering 4.3 (2007): pp. 469-473. (Year: 2007).*
(Continued)

*Primary Examiner* — Satish Rampuria
(74) *Attorney, Agent, or Firm* — The Petruzzi Law Firm; James D. Petruzzi

(57) ABSTRACT

A method for monitoring operational conditions of an HVAC unit and providing preventive maintenance alerts and/or troubleshooting instructions using an ordered set of causes for sensed parameters by monitoring parameters of the HVAC unit with sensors, collecting real time information and transmitting the data and analyzing the data with a processor and comparing it to a list of pre-determined data set points to determine variances from the set points and identification of one or more maintenance alerts and/or trouble events associated with variances, matching them to at least one of the events, displaying instructions to a user for resolving the event in a descending order determined by the processor of the most likely causes along with an associated solution for each cause, and providing a pre-failure solution from the stored set of instructions based on analysis of the stored data and timed sensor values.

20 Claims, 73 Drawing Sheets

Related U.S. Application Data

(60) Provisional application No. 62/061,765, filed on Oct. 9, 2014.

(51) Int. Cl.
  *F24F 11/00* (2018.01)
  *F24F 11/30* (2018.01)
  *F24F 11/62* (2018.01)
  *F24F 110/00* (2018.01)

(58) Field of Classification Search
  USPC .................................................. 700/275–306
  See application file for complete search history.

(56) References Cited

U.S. PATENT DOCUMENTS

| | | | | |
|---|---|---|---|---|
| 2010/0070234 A1* | 3/2010 | Steinberg | ............... | G01K 13/00 702/130 |
| 2012/0016526 A1* | 1/2012 | Burton | ............... | G05D 23/1931 700/278 |
| 2013/0338837 A1* | 12/2013 | Hublou | ............... | G05D 23/1923 700/278 |
| 2014/0163744 A1* | 6/2014 | Dolcich | ............. | H05K 7/20836 700/276 |
| 2015/0127172 A1* | 5/2015 | Quam | ...................... | F24F 11/63 700/276 |

OTHER PUBLICATIONS

Pfingsten, Tobias, et al. "Feature selection for troubleshooting in complex assembly lines." IEEE transactions on automation science and engineering 4.3 (2007): pp. 465-469. (Year: 2007).*

Wang, Liping. "Modeling and simulation of HVAC faulty operations and performance degradation due to maintenance issues." (2013).pp. 1-11 (Year: 2013).*

\* cited by examiner

| EVENT01 – Stage 1 High Superheat and Low Subcool Detected ||
|---|---|
| Possible Causes (listed in order of likeliness) | Recommended Solutions |
| Stage 1 is low on refrigerant | Stop the unit and find the source of the refrigerant leak, recover remaining refrigerant, repair the leak, and recharge the system by weight to the nameplate value. If no leak is found and the Stage 1 system has the correct factory charge (confirmed by recovery and weighing in the charge), the actual operating conditions may differ from anticipated factory conditions. Add ½ lb. of refrigerant until the correct superheat and subcool values (between 10°F – 20°F) are seen during operation. Allow 15 minutes between adding charge for the system to stabilize before taking or evaluating readings. |
| Stage 1 suction pressure transducer out of calibration | The Stage 1 suction line pressure transducer may have 'drifted' and is reading abnormally lower than actual pressure. Using a calibrated pressure gauge, measure the actual Stage 1 suction pressure and compare with the reported Stage 1 suction pressure. Actual Stage 1 pressure must compare within ±3 psig of the reported Stage 1 suction pressure. If there is a greater difference, replace the Stage 1 suction pressure transducer. |
| Stage 1 liquid line pressure transducer out of calibration | The Stage 1 liquid line pressure transducer may have 'drifted' and is reading abnormally lower than actual pressure. Using a calibrated pressure gauge, measure the actual Stage 1 liquid line pressure and compare with the reported Stage 1 liquid line pressure. Actual Stage 1 pressure must compare within ±3 psig of the reported Stage 1 liquid line pressure. If there is a greater difference, replace the Stage 1 liquid line pressure transducer. |
| Stage 1 suction line temperature sensor out of calibration | The Stage 1 suction line temperature sensor may have 'drifted' and is reading abnormally higher than the actual temperature. Using a calibrated temperature sensor, measure the actual temperature on the suction line and compare it with the reported Stage 1 suction line temperature. If there is greater than ±2°F |

Fig. 3A

| EVENT01 – Stage 1 High Superheat and Low Subcool Detected ||
|---|---|
| | difference, replace the Stage 1 suction line temperature sensor. |
| Stage 1 liquid line temperature sensor out of calibration | The Stage 1 liquid line temperature sensor may have 'drifted' and is reading abnormally higher than the actual temperature. Using a calibrated temperature sensor, measure the actual temperature on the liquid line and compare it with the reported Stage 1 liquid line temperature. If there is greater than ±2°F difference, replace the Stage 1 liquid line temperature sensor. |

| EVENT02 – Stage 1 Low Superheat and High Subcool Detected ||
|---|---|
| Possible Causes (listed in order of likeliness) | Recommended Solutions |
| High on refrigerant charge | Confirm that by recovery and weighing in the nameplate value of refrigerant charge that Stage 1 system has the correct factory charge. If the unit has the correct factory charge and the system still shows a low superheat and high subcool, then the actual operating conditions may differ from anticipated factory conditions. Remove ½ lb. of refrigerant until the correct superheat and subcool values (between 10°F – 20°F) are seen during operation. Allow 15 minutes between removing charge for the system to stabilize before taking or evaluating readings. |
| Stage 1 suction pressure transducer out of calibration | The Stage 1 suction line pressure transducer may have 'drifted' and is reading abnormally higher than actual pressure. Using a calibrated pressure gauge, measure the actual Stage 1 suction pressure and compare with the reported Stage 1 suction pressure. Actual Stage 1 pressure must compare within ±3 psig of the reported Stage 1 suction pressure. If there is a greater difference, replace the Stage 1 suction pressure transducer. |
| Stage 1 liquid line pressure transducer out of calibration | The Stage 1 liquid line pressure transducer may have 'drifted' and is reading abnormally higher than actual pressure. Using a calibrated pressure gauge, measure the actual Stage 1 |

Fig. 3B

| EVENT02 – Stage 1 Low Superheat and High Subcool Detected ||
|---|---|
| | liquid line pressure and compare with the reported Stage 1 liquid line pressure. Actual Stage 1 pressure must compare within ±3 psig of the reported Stage 1 liquid line pressure. If there is a greater difference, replace the Stage 1 liquid line pressure transducer. |
| Stage 1 suction line temperature sensor out of calibration | The Stage 1 suction line temperature sensor may have 'drifted' and is reading abnormally lower than the actual temperature. Using a calibrated temperature sensor, measure the actual temperature on the suction line and compare it with the reported Stage 1 suction line temperature. If there is greater than ±2°F difference, replace the Stage 1 suction line temperature sensor. |
| Stage 1 liquid line temperature sensor out of calibration | The Stage 1 liquid line temperature sensor may have 'drifted' and is reading abnormally lower than the actual temperature. Using a calibrated temperature sensor, measure the actual temperature on the liquid line and compare it with the reported Stage 1 liquid line temperature. If there is greater than ±2°F difference, replace the Stage 1 liquid line temperature sensor. |

| EVENT03 – Stage 1 High Superheat and High Subcool Detected ||
|---|---|
| Possible Causes (listed in order of likeliness) | Recommended Solutions |
| Incorrectly adjusted thermal expansion valve | Open the expansion valve (turn the stem clockwise) ½ turn at a time until you see the correct superheat and sub-cool values (between 10°F – 20°F). Allow 15 minutes between valve settings for the system to stabilize before taking or evaluating readings. |
| Blockage in the thermal expansion valve | This blockage could be in the form of ice due to excessive moisture in the system or the blockage could come from left over debris in the system including solder, copper shavings, or oxidation. To repair, recover the refrigerant and unsolder the expansion valve and inspect for debris. It is recommended to replace the expansion valve. After reinstallation, ensure the |

Fig. 3C

| EVENT03 – Stage 1 High Superheat and High Subcool Detected ||
|---|---|
| | system is put under a deep vacuum (500 microns) for 4-6 hours and then re-charge the system by weight to the nameplate value. |
| Dead thermostatic charge in the expansion valve | The thermostatic charge may have been lost in the expansion valves sensing bulb. Inspect the sensing bulb and sensing line for cracks. For confirmation that the thermostatic charge is lost, run System 1 under a high load and place the sensing bulb in a cup of ice water. If the superheat does not change from high to lower, then the thermostatic charge is lost. Replace the power cap or thermal expansion valve. Most times when the thermostatic charge is lost in the sensing bulb, the system will cycle off on low suction pressure. |
| Stage 1 suction pressure transducer out of calibration | The Stage 1 suction line pressure transducer may have 'drifted' and is reading abnormally lower than actual pressure. Using a calibrated pressure gauge, measure the actual Stage 1 suction pressure and compare with the reported Stage 1 suction pressure. Actual Stage 1 pressure must compare within ±3 psig of the reported Stage 1 suction pressure. If there is a greater difference, replace the Stage 1 suction pressure transducer. |
| Stage 1 liquid line pressure transducer out of calibration | The Stage 1 liquid line pressure transducer may have 'drifted' and is reading abnormally higher than actual pressure. Using a calibrated pressure gauge, measure the actual Stage 1 liquid line pressure and compare with the reported Stage 1 liquid line pressure. Actual Stage 1 pressure must compare within ±3 psig of the reported Stage 1 liquid line pressure. If there is a greater difference, replace the Stage 1 liquid line pressure transducer. |
| Stage 1 suction line temperature sensor out of calibration | The Stage 1 suction line temperature sensor may have 'drifted' and is reading abnormally higher than the actual temperature. Using a calibrated temperature sensor, measure the actual temperature on the suction line and compare it with the reported Stage 1 suction line temperature. If there is greater than ±2°F difference, replace the Stage 1 suction line temperature sensor. |

Fig. 3D

| EVENT03 – Stage 1 High Superheat and High Subcool Detected ||
|---|---|
| Stage 1 liquid line temperature sensor out of calibration | The Stage 1 liquid line temperature sensor may have 'drifted' and is reading abnormally lower than the actual temperature. Using a calibrated temperature sensor, measure the actual temperature on the liquid line and compare it with the reported Stage 1 liquid line temperature. If there is greater than ±2°F difference, replace the Stage 1 liquid line temperature sensor. |
| Undersized thermal expansion valve | If all other conditions have been check and ruled out and the system still shows a high superheat and high subcool, then the actual operating conditions may differ from anticipated factory conditions and the valve may be undersized for the conditions the is operating in. For verification, try to decrease the load on the system (decrease the return air temperature or decreasing the evaporator airflow). If the expansion valve is able to modulate the superheat and subcool lower and keep it within range, then the valve may be undersized. At this point, consult with a factory service representative for assistance. |

| EVENT04 – Stage 1 Low Superheat and Low Subcool Detected ||
|---|---|
| Possible Causes (listed in order of likeliness) | Recommended Solutions |
| Incorrectly adjusted thermal expansion valve | Close the expansion valve (turn the stem counter clockwise) ½ turn at a time until the correct superheat and subcool values (between 10°F – 20°F) are seen during operation. Allow 15 minutes between valve settings for the system to stabilize before taking or evaluating readings. |
| Poor sensing bulb location or poor bulb contact with the suction line | Check for proper location, installation, and insulation of the sensing bulb. The sensing bulb should be securely fastened to a clean straight section of the suction line and should not be influenced by ambient temperature. On lines greater tha7/8" the bulb should be installed at a 4:00 or 8 o'clock position. For smaller lines, |

Fig. 3E

| EVENT04 – Stage 1 Low Superheat and Low Subcool Detected ||
|---|---|
|  | the bulb may be located at any position with the exception of at the bottom of the line. |
| Stage 1 suction pressure transducer out of calibration | The Stage 1 suction line pressure transducer may have 'drifted' and is reading abnormally higher than actual pressure. Using a calibrated pressure gauge, measure the actual Stage 1 suction pressure and compare with the reported Stage 1 suction pressure. Actual Stage 1 pressure must compare within ±3 psig of the reported Stage 1 suction pressure. If there is a greater difference, replace the Stage 1 suction pressure transducer. |
| Stage 1 liquid line pressure transducer out of calibration | The Stage 1 liquid line pressure transducer may have 'drifted' and is reading abnormally lower than actual pressure. Using a calibrated pressure gauge, measure the actual Stage 1 liquid line pressure and compare with the reported Stage 1 liquid line pressure. Actual Stage 1 pressure must compare within ±3 psig of the reported Stage 1 liquid line pressure. If there is a greater difference, replace the Stage 1 liquid line pressure transducer. |
| Stage 1 suction line temperature sensor out of calibration | The Stage 1 suction line temperature sensor may have 'drifted' and is reading abnormally lower than the actual temperature. Using a calibrated temperature sensor, measure the actual temperature on the suction line and compare it with the reported Stage 1 suction line temperature. If there is greater than ±2°F difference, replace the Stage 1 suction line temperature sensor. |
| Stage 1 liquid line temperature sensor out of calibration | The Stage 1 liquid line temperature sensor may have 'drifted' and is reading abnormally higher than the actual temperature. Using a calibrated temperature sensor, measure the actual temperature on the liquid line and compare it with the reported Stage 1 liquid line temperature. If there is greater than ±2°F difference, replace the Stage 1 liquid line temperature sensor. |
| Oversized thermal expansion valve | If all other conditions have been check and ruled out and the system still shows a low superheat and low subcool, then the actual operating conditions may differ from |

Fig. 3F

| EVENT04 – Stage 1 Low Superheat and Low Subcool Detected ||
|---|---|
| | anticipated factory conditions and the valve may be oversized for the conditions the is operating in. For verification, try to increase the load on the system (increasing the return air temperature or increasing the evaporator airflow). If the expansion valve is able to modulate the superheat and subcool higher and keep it within range, then the valve may be oversized. At this point, consult with a factory service representative for assistance. |

| EVENT05 – Stage 1 High Superheat ||
|---|---|
| Possible Causes (listed in order of likeliness) | Recommended Solutions |
| Stage 1 is low on refrigerant | Stop unit and find the source of the refrigerant leak, recover remaining refrigerant, repair the leak, and recharge the system by weight to the nameplate value. If no leak is found and the Stage 1 system has the correct factory charge (confirmed by recovery and weighing in the charge), the actual operating conditions may differ from anticipated factory conditions. Add ½ lb. of refrigerant until the correct superheat and subcool values (between 10°F – 20°F) are seen during operation. Allow 15 minutes between adding charge for the system to stabilize before taking or evaluating readings. |
| Incorrectly adjusted thermal expansion valve | Open the expansion valve (turn the stem clockwise) ½ turn at a time until you see the correct superheat and sub-cool values (between 10°F – 20°F). Allow 15 minutes between valve settings for the system to stabilize before taking or evaluating readings. |
| Stage 1 suction pressure transducer out of calibration | The Stage 1 suction line pressure transducer may have 'drifted' and is reading abnormally lower than actual pressure. Using a calibrated pressure gauge, measure the actual Stage 1 suction pressure and compare with the reported Stage 1 suction pressure. Actual Stage 1 pressure must compare within ±3 psig of the reported Stage 1 suction pressure. If there is a |

Fig. 3G

| EVENT05 – Stage 1 High Superheat ||
|---|---|
| | greater difference, replace the Stage 1 suction pressure transducer. |
| Stage 1 suction line temperature sensor out of calibration | The Stage 1 suction line temperature sensor may have 'drifted' and is reading abnormally higher than the actual temperature. Using a calibrated temperature sensor, measure the actual temperature on the suction line and compare it with the reported Stage 1 suction line temperature. If there is greater than ±2°F difference, replace the Stage 1 suction line temperature sensor. |

| EVENT06 – Stage 1 Low Superheat ||
|---|---|
| Possible Causes (listed in order of likeliness) | Recommended Solutions |
| Incorrectly adjusted thermal expansion valve | Close the expansion valve (turn the stem counter clockwise) ½ turn at a time until the correct superheat and subcool values (between 10°F – 20°F) are seen during operation. Allow 15 minutes between valve settings for the system to stabilize before taking or evaluating readings. |
| Poor sensing bulb location or poor bulb contact with the suction line | Check for proper location, installation, and insulation of the sensing bulb. The sensing bulb should be securely fastened to a clean straight section of the suction line and should not be influenced by ambient temperature. On lines greater tha7/8" the bulb should be installed at a 4:00 or 8 o'clock position. For smaller lines, the bulb may be located at any position with the exception of at the bottom of the line. |
| Stage 1 suction pressure transducer out of calibration | The Stage 1 suction line pressure transducer may have 'drifted' and is reading abnormally higher than actual pressure. Using a calibrated pressure gauge, measure the actual Stage 1 suction pressure and compare with the reported Stage 1 suction pressure. Actual Stage 1 pressure must compare within ±3 psig of the reported Stage 1 suction pressure. If there is a greater difference, replace the Stage 1 suction pressure transducer. |

Fig. 3H

| EVENT06 – Stage 1 Low Superheat ||
|---|---|
| Stage 1 suction line temperature sensor out of calibration | The Stage 1 suction line temperature sensor may have 'drifted' and is reading abnormally lower than the actual temperature. Using a calibrated temperature sensor, measure the actual temperature on the suction line and compare it with the reported Stage 1 suction line temperature. If there is greater than ±2°F difference, replace the Stage 1 suction line temperature sensor. |

Fig. 3I

| EVENT07 – Stage 1 High Subcool Detected ||
|---|---|
| Possible Causes<br>(listed in order of likeliness) | Recommended Solutions |
| High on refrigerant charge | Confirm that by recovery and weighing in the nameplate value of refrigerant charge that Stage 1 system has the correct factory charge. If the unit has the correct factory charge and the system still shows a low superheat and high subcool, then the actual operating conditions may differ from anticipated factory conditions. Remove ½ lb. of refrigerant until the correct superheat and subcool values (between 10°F – 20°F) are seen during operation. Allow 15 minutes between removing charge for the system to stabilize before taking or evaluating readings. |
| Incorrectly adjusted thermal expansion valve | Open the expansion valve (turn the stem clockwise) ½ turn at a time until you see the correct superheat and sub-cool values (between 10°F – 20°F). Allow 15 minutes between valve settings for the system to stabilize before taking or evaluating readings. |
| Blockage in the thermal expansion valve | This blockage could be in the form of ice due to excessive moisture in the system or the blockage could come from left over debris in the system including solder, copper shavings, or oxidation. To repair, recover the refrigerant and unsolder the expansion valve and inspect for debris. It is recommended to replace the expansion valve. After reinstallation, ensure the system is put under a deep vacuum (500 microns) for 4-6 hours and then re-charge the system by weight to the nameplate value. |
| Dead thermostatic charge in the expansion valve | The thermostatic charge may have been lost in the expansion valves sensing bulb. Inspect the sensing bulb and sensing line for cracks. For confirmation that the thermostatic charge is lost, run System 1 under a high load and place the sensing bulb in a cup of ice water. If the superheat does not change from high to lower, then the thermostatic charge is lost. Replace the thermal expansion valve. Most times when the thermostatic charge is lost in the sensing bulb, |

Fig. 4A

| EVENT07 – Stage 1 High Subcool Detected ||
|---|---|
| | the system will cycle off on low suction pressure. |
| Stage 1 liquid line pressure transducer out of calibration | The Stage 1 liquid line pressure transducer may have 'drifted' and is reading abnormally higher than actual pressure. Using a calibrated pressure gauge, measure the actual Stage 1 liquid line pressure and compare with the reported Stage 1 liquid line pressure. Actual Stage 1 pressure must compare within ±3 psig of the reported Stage 1 liquid line pressure. If there is a greater difference, replace the Stage 1 liquid line pressure transducer. |
| Stage 1 liquid line temperature sensor out of calibration | The Stage 1 liquid line temperature sensor may have 'drifted' and is reading abnormally lower than the actual temperature. Using a calibrated temperature sensor, measure the actual temperature on the liquid line and compare it with the reported Stage 1 liquid line temperature. If there is greater than ±2°F difference, replace the Stage 1 liquid line temperature sensor. |

| EVENT08 – Stage 1 Low Subcool Detected ||
|---|---|
| Possible Causes (listed in order of likeliness) | Recommended Solutions |
| Dirty or blocked condenser coil | The condenser coil may be dirty due to dust, sand, dirt or some other foreign debris (newspaper, a plastic bag, or cotton from a nearby cotton tree). Also inspect condenser coil for bent fin restrictions. This may foul the condenser and interfere with the heat transfer process or block airflow from entering the coil. Remove any debris from the condenser and clean the condenser coil with a commercially available coil cleaner such as NuCalgon Nu-Brite® or Simple Green or comb out bent fins on the coil as necessary. |
| Stage 1 is low on refrigerant | Stop unit and find the source of the refrigerant leak, recover remaining refrigerant, repair the leak, and recharge the system by weight to the nameplate value. If no leak is found and the Stage 1 system has the correct factory charge |

Fig. 4B

| EVENT08 – Stage 1 Low Subcool Detected ||
|---|---|
| | (confirmed by recovery and weighing in the charge), the actual operating conditions may differ from anticipated factory conditions. Add ½ lb. of refrigerant until the correct superheat and subcool values (between 10°F – 20°F) are seen during operation. Allow 15 minutes between adding charge for the system to stabilize before taking or evaluating readings. |
| Incorrectly adjusted thermal expansion valve | Close the expansion valve (turn the stem counter clockwise) ½ turn at a time until the correct superheat and subcool values (between 10°F – 20°F) are seen during operation. Allow 15 minutes between valve settings for the system to stabilize before taking or evaluating readings. |
| Poor sensing bulb location or poor bulb contact with the suction line | Check for proper location, installation, and insulation of the sensing bulb. The sensing bulb should be securely fastened to a clean straight section of the suction line and should not be influenced by ambient temperature. On lines greater tha7/8" the bulb should be installed at a 4:00 or 8 o'clock position. For smaller lines, the bulb may be located at any position with the exception of at the bottom of the line. |
| Stage 1 liquid line pressure transducer out of calibration | The Stage 1 liquid line pressure transducer may have 'drifted' and is reading abnormally lower than actual pressure. Using a calibrated pressure gauge, measure the actual Stage 1 liquid line pressure and compare with the reported Stage 1 liquid line pressure. Actual Stage 1 pressure must compare within ±3 psig of the reported Stage 1 liquid line pressure. If there is a greater difference, replace the Stage 1 liquid line pressure transducer. |
| Stage 1 liquid line temperature sensor out of calibration | The Stage 1 liquid line temperature sensor may have 'drifted' and is reading abnormally higher than the actual temperature. Using a calibrated temperature sensor, measure the actual temperature on the liquid line and compare it with the reported Stage 1 liquid line temperature. If there is greater than ±2°F difference, replace the Stage 1 liquid line temperature sensor. |

Fig. 4C

| EVENT08 – Stage 1 Low Subcool Detected ||
|---|---|
| Oversized thermal expansion valve | If all other conditions have been check and ruled out and the system still shows a low superheat and low subcool, then the actual operating conditions may differ from anticipated factory conditions and the valve may be oversized for the conditions the is operating in. For verification, try to increase the load on the system (increasing the return air temperature or increasing the evaporator airflow). If the expansion valve is able to modulate the superheat and subcool higher and keep it within range, then the valve may be oversized. At this point, consult with a factory service representative for assistance. |

| EVENT09 – Stage 2 High Superheat and Low Subcool Detected ||
|---|---|
| Possible Causes<br>(listed in order of likeliness) | Recommended Solutions |
| Stage 2 is low on refrigerant | Stop unit and find the source of the refrigerant leak, recover remaining refrigerant, repair the leak, and recharge the system by weight to the nameplate value. If no leak is found and the Stage 2 system has the correct factory charge (confirmed by recovery and weighing in the charge), the actual operating conditions may differ from anticipated factory conditions. Add ½ lb. of refrigerant until the correct superheat and subcool values (between 10°F – 20°F) are seen during operation. Allow 15 minutes between adding charge for the system to stabilize before taking or evaluating readings. |
| Stage 2 suction pressure transducer out of calibration | The Stage 2 suction line pressure transducer may have 'drifted' and is reading abnormally lower than actual pressure. Using a calibrated pressure gauge, measure the actual Stage 2 suction pressure and compare with the reported Stage 2 suction pressure. Actual Stage 2 pressure must compare within ±3 psig of the reported Stage 2 suction pressure. If there is a greater difference, replace the Stage 2 suction pressure transducer. |

Fig. 4D

| EVENT09 – Stage 2 High Superheat and Low Subcool Detected ||
|---|---|
| Stage 2 liquid line pressure transducer out of calibration | The Stage 2 liquid line pressure transducer may have 'drifted' and is reading abnormally lower than actual pressure. Using a calibrated pressure gauge, measure the actual Stage 2 liquid line pressure and compare with the reported Stage 2 liquid line pressure. Actual Stage 2 pressure must compare within ±3 psig of the reported Stage 2 liquid line pressure. If there is a greater difference, replace the Stage 2 liquid line pressure transducer. |
| Stage 2 suction line temperature sensor out of calibration | The Stage 2 suction line temperature sensor may have 'drifted' and is reading abnormally higher than the actual temperature. Using a calibrated temperature sensor, measure the actual temperature on the suction line and compare it with the reported Stage 2 suction line temperature. If there is greater than ±2°F difference, replace the Stage 2 suction line temperature sensor. |
| Stage 2 liquid line temperature sensor out of calibration | The Stage 2 liquid line temperature sensor may have 'drifted' and is reading abnormally higher than the actual temperature. Using a calibrated temperature sensor, measure the actual temperature on the liquid line and compare it with the reported Stage 2 liquid line temperature. If there is greater than ±2°F difference, replace the Stage 2 liquid line temperature sensor. |

| EVENT10 – Stage 2 Low Superheat and High Subcool Detected ||
|---|---|
| Possible Causes (listed in order of likeliness) | Recommended Solutions |
| High on refrigerant charge | Confirm that by recovery and weighing in the nameplate value of refrigerant charge that Stage 2 system has the correct factory charge. If the unit has the correct factory charge and the system still shows a low superheat and high subcool, then the actual operating conditions may differ from anticipated factory conditions. Remove ½ lb. of refrigerant until the correct superheat and subcool values (between 10°F – 20°F) are seen during operation. Allow 15 |

Fig. 4E

| EVENT10 – Stage 2 Low Superheat and High Subcool Detected ||
|---|---|
| | minutes between removing charge for the system to stabilize before taking or evaluating readings. |
| Stage 2 suction pressure transducer out of calibration | The Stage 2 suction line pressure transducer may have 'drifted' and is reading abnormally higher than actual pressure. Using a calibrated pressure gauge, measure the actual Stage 2 suction pressure and compare with the reported Stage 2 suction pressure. Actual Stage 2 pressure must compare within ±3 psig of the reported Stage 2 suction pressure. If there is a greater difference, replace the Stage 2 suction pressure transducer. |
| Stage 2 liquid line pressure transducer out of calibration | The Stage 2 liquid line pressure transducer may have 'drifted' and is reading abnormally higher than actual pressure. Using a calibrated pressure gauge, measure the actual Stage 2 liquid line pressure and compare with the reported Stage 2 liquid line pressure. Actual Stage 2 pressure must compare within ±3 psig of the reported Stage 2 liquid line pressure. If there is a greater difference, replace the Stage 2 liquid line pressure transducer. |
| Stage 2 suction line temperature sensor out of calibration | The Stage 2 suction line temperature sensor may have 'drifted' and is reading abnormally lower than the actual temperature. Using a calibrated temperature sensor, measure the actual temperature on the suction line and compare it with the reported Stage 2 suction line temperature. If there is greater than ±2°F difference, replace the Stage 2 suction line temperature sensor. |
| Stage 2 liquid line temperature sensor out of calibration | The Stage 2 liquid line temperature sensor may have 'drifted' and is reading abnormally lower than the actual temperature. Using a calibrated temperature sensor, measure the actual temperature on the liquid line and compare it with the reported Stage 2 liquid line temperature. If there is greater than ±2°F difference, replace the Stage 2 liquid line temperature sensor. |

Fig. 4F

| EVENT11 – Stage 2 High Superheat and High Subcool Detected ||
|---|---|
| Possible Causes (listed in order of likeliness) | Recommended Solutions |
| Incorrectly adjusted thermal expansion valve | Open the expansion valve (turn the stem clockwise) ½ turn at a time until you see the correct superheat and sub-cool values (between 10°F – 20°F). Allow 15 minutes between valve settings for the system to stabilize before taking or evaluating readings. |
| Blockage in the thermal expansion valve | This blockage could be in the form of ice due to excessive moisture in the system or the blockage could come from left over debris in the system including solder, copper shavings, or oxidation. To repair, recover the refrigerant and unsolder the expansion valve and inspect for debris. It is recommended to replace the expansion valve. After reinstallation, ensure the system is put under a deep vacuum (500 microns) for 4-6 hours and then re-charge the system by weight to the nameplate value. |
| Dead thermostatic charge in the expansion valve | The thermostatic charge may have been lost in the expansion valves sensing bulb. Inspect the sensing bulb and sensing line for cracks. For confirmation that the thermostatic charge is lost, run System 1 under a high load and place the sensing bulb in a cup of ice water. If the superheat does not change from high to lower, then the thermostatic charge is lost. Replace the thermal expansion valve. Most times when the thermostatic charge is lost in the sensing bulb, the system will cycle off on low suction pressure. |
| Stage 2 suction pressure transducer out of calibration | The Stage 2 suction line pressure transducer may have 'drifted' and is reading abnormally lower than actual pressure. Using a calibrated pressure gauge, measure the actual Stage 2 suction pressure and compare with the reported Stage 2 suction pressure. Actual Stage 2 pressure must compare within ±3 psig of the reported Stage 2 suction pressure. If there is a greater difference, replace the Stage 2 suction pressure transducer. |
| Stage 2 liquid line pressure transducer out of calibration | The Stage 2 liquid line pressure transducer may have 'drifted' and is reading abnormally higher than actual pressure. Using a calibrated |

Fig. 4G

| EVENT11 – Stage 2 High Superheat and High Subcool Detected ||
|---|---|
| | pressure gauge, measure the actual Stage 2 liquid line pressure and compare with the reported Stage 2 liquid line pressure. Actual Stage 2 pressure must compare within ±3 psig of the reported Stage 2 liquid line pressure. If there is a greater difference, replace the Stage 2 liquid line pressure transducer. |
| Stage 2 suction line temperature sensor out of calibration | The Stage 2 suction line temperature sensor may have 'drifted' and is reading abnormally higher than the actual temperature. Using a calibrated temperature sensor, measure the actual temperature on the suction line and compare it with the reported Stage 2 suction line temperature. If there is greater than ±2°F difference, replace the Stage 2 suction line temperature sensor. |
| Stage 2 liquid line temperature sensor out of calibration | The Stage 2 liquid line temperature sensor may have 'drifted' and is reading abnormally lower than the actual temperature. Using a calibrated temperature sensor, measure the actual temperature on the liquid line and compare it with the reported Stage 2 liquid line temperature. If there is greater than ±2°F difference, replace the Stage 2 liquid line temperature sensor. |
| Undersized thermal expansion valve | If all other conditions have been check and ruled out and the system still shows a high superheat and high subcool, then the actual operating conditions may differ from anticipated factory conditions and the valve may be undersized for the conditions the is operating in. For verification, try to decrease the load on the system (decrease the return air temperature or decreasing the evaporator airflow). If the expansion valve is able to modulate the superheat and subcool lower and keep it within range, then the valve may be undersized. At this point, consult with a factory service representative for assistance. |

Fig. 4H

| EVENT12 – Stage 2 Low Superheat and Low Subcool Detected ||
|---|---|
| Possible Causes (listed in order of likeliness) | Recommended Solutions |
| Incorrectly adjusted thermal expansion valve | Close the expansion valve (turn the stem counter clockwise) ½ turn at a time until the correct superheat and subcool values (between 10°F – 20°F) are seen during operation. Allow 15 minutes between valve settings for the system to stabilize before taking or evaluating readings. |
| Poor sensing bulb location or poor bulb contact with the suction line | Check for proper location, installation, and insulation of the sensing bulb. The sensing bulb should be securely fastened to a clean straight section of the suction line and should not be influenced by ambient temperature. On lines greater tha7/8" the bulb should be installed at a 4:00 or 8 o'clock position. For smaller lines, the bulb may be located at any position with the exception of at the bottom of the line. |
| Stage 2 suction pressure transducer out of calibration | The Stage 2 suction line pressure transducer may have 'drifted' and is reading abnormally higher than actual pressure. Using a calibrated pressure gauge, measure the actual Stage 2 suction pressure and compare with the reported Stage 2 suction pressure. Actual Stage 2 pressure must compare within ±3 psig of the reported Stage 2 suction pressure. If there is a greater difference, replace the Stage 2 suction pressure transducer. |
| Stage 2 liquid line pressure transducer out of calibration | The Stage 2 liquid line pressure transducer may have 'drifted' and is reading abnormally lower than actual pressure. Using a calibrated pressure gauge, measure the actual Stage 2 liquid line pressure and compare with the reported Stage 2 liquid line pressure. Actual Stage 2 pressure must compare within ±3 psig of the reported Stage 2 liquid line pressure. If there is a greater difference, replace the Stage 2 liquid line pressure transducer. |
| Stage 2 suction line temperature sensor out of calibration | The Stage 2 suction line temperature sensor may have 'drifted' and is reading abnormally lower than the actual temperature. Using a calibrated temperature sensor, measure the actual temperature on the suction line and compare it with the reported Stage 2 suction |

Fig. 5A

| EVENT12 – Stage 2 Low Superheat and Low Subcool Detected ||
|---|---|
| | line temperature. If there is greater than ±2°F difference, replace the Stage 2 suction line temperature sensor. |
| Stage 2 liquid line temperature sensor out of calibration | The Stage 2 liquid line temperature sensor may have 'drifted' and is reading abnormally higher than the actual temperature. Using a calibrated temperature sensor, measure the actual temperature on the liquid line and compare it with the reported Stage 2 liquid line temperature. If there is greater than ±2°F difference, replace the Stage 2 liquid line temperature sensor. |
| Oversized thermal expansion valve | If all other conditions have been check and ruled out and the system still shows a low superheat and low subcool, then the actual operating conditions may differ from anticipated factory conditions and the valve may be oversized for the conditions the is operating in. For verification, try to increase the load on the system (increasing the return air temperature or increasing the evaporator airflow). If the expansion valve is able to modulate the superheat and subcool higher and keep it within range, then the valve may be oversized. At this point, consult with a factory service representative for assistance. |

| EVENT13 - Stage 2 High Superheat ||
|---|---|
| Possible Causes (listed in order of likeliness) | Recommended Solutions |
| Stage 2 is low on refrigerant | Stop unit and find the source of the refrigerant leak, recover remaining refrigerant, repair the leak, and recharge the system by weight to the nameplate value. If no leak is found and the Stage 2 system has the correct factory charge (confirmed by recovery and weighing in the charge), the actual operating conditions may differ from anticipated factory conditions. Add ½ lb. of refrigerant until the correct superheat and subcool values (between 10°F – 20°F) are seen during operation. Allow 15 minutes between adding charge for the system to |

Fig. 5B

| EVENT13 - Stage 2 High Superheat ||
|---|---|
| | stabilize before taking or evaluating readings. |
| Incorrectly adjusted thermal expansion valve | Open the expansion valve (turn the stem clockwise) ½ turn at a time until you see the correct superheat and sub-cool values (between 10°F – 20°F). Allow 15 minutes between valve settings for the system to stabilize before taking or evaluating readings. |
| Stage 2 suction pressure transducer out of calibration | The Stage 2 suction line pressure transducer may have 'drifted' and is reading abnormally lower than actual pressure. Using a calibrated pressure gauge, measure the actual Stage 2 suction pressure and compare with the reported Stage 2 suction pressure. Actual Stage 2 pressure must compare within ±3 psig of the reported Stage 2 suction pressure. If there is a greater difference, replace the Stage 2 suction pressure transducer. |
| Stage 2 suction line temperature sensor out of calibration | The Stage 2 suction line temperature sensor may have 'drifted' and is reading abnormally higher than the actual temperature. Using a calibrated temperature sensor, measure the actual temperature on the suction line and compare it with the reported Stage 2 suction line temperature. If there is greater than ±2°F difference, replace the Stage 2 suction line temperature sensor. |

| EVENT14 - Stage 2 Low Superheat ||
|---|---|
| Possible Causes (listed in order of likeliness) | Recommended Solutions |
| Incorrectly adjusted thermal expansion valve | Close the expansion valve (turn the stem counter clockwise) ½ turn at a time until the correct superheat and subcool values (between 10°F – 20°F) are seen during operation. Allow 15 minutes between valve settings for the system to stabilize before taking or evaluating readings. |
| Poor sensing bulb location or poor bulb contact with the suction line | Check for proper location, installation, and insulation of the sensing bulb. The sensing bulb should be securely fastened to a clean straight section of the suction line and should not be influenced by ambient temperature. On lines |

Fig. 5C

| EVENT14 - Stage 2 Low Superheat ||
| --- | --- |
| | greater tha7/8" the bulb should be installed at a 4:00 or 8 o'clock position. For smaller lines, the bulb may be located at any position with the exception of at the bottom of the line. |
| Stage 2 suction pressure transducer out of calibration | The Stage 2 suction line pressure transducer may have 'drifted' and is reading abnormally higher than actual pressure. Using a calibrated pressure gauge, measure the actual Stage 2 suction pressure and compare with the reported Stage 2 suction pressure. Actual Stage 2 pressure must compare within ±3 psig of the reported Stage 2 suction pressure. If there is a greater difference, replace the Stage 2 suction pressure transducer. |
| Stage 2 suction line temperature sensor out of calibration | The Stage 2 suction line temperature sensor may have 'drifted' and is reading abnormally lower than the actual temperature. Using a calibrated temperature sensor, measure the actual temperature on the suction line and compare it with the reported Stage 2 suction line temperature. If there is greater than ±2°F difference, replace the Stage 2 suction line temperature sensor. |

| EVENT15 - Stage 2 High Subcool Detected ||
| --- | --- |
| Possible Causes (listed in order of likeliness) | Recommended Solutions |
| High on refrigerant charge | Confirm that by recovery and weighing in the nameplate value of refrigerant charge that Stage 2 system has the correct factory charge. If the unit has the correct factory charge and the system still shows a low superheat and high subcool, then the actual operating conditions may differ from anticipated factory conditions. Remove ½ lb. of refrigerant until the correct superheat and subcool values (between 10°F – 20°F) are seen during operation. Allow 15 minutes between removing charge for the system to stabilize before taking or evaluating readings. |
| Incorrectly adjusted thermal expansion valve | Open the expansion valve (turn the stem clockwise) ½ turn at a time until you see the |

Fig. 5D

| EVENT15 - Stage 2 High Subcool Detected ||
|---|---|
| | correct superheat and sub-cool values (between 10°F – 20°F). Allow 15 minutes between valve settings for the system to stabilize before taking or evaluating readings. |
| Blockage in the thermal expansion valve | This blockage could be in the form of ice due to excessive moisture in the system or the blockage could come from left over debris in the system including solder, copper shavings, or oxidation. To repair, recover the refrigerant and unsolder the expansion valve and inspect for debris. It is recommended to replace the expansion valve. After reinstallation, ensure the system is put under a deep vacuum (500 microns) for 4-6 hours and then re-charge the system by weight to the nameplate value. |
| Dead thermostatic charge in the expansion valve | The thermostatic charge may have been lost in the expansion valves sensing bulb. Inspect the sensing bulb and sensing line for cracks. For confirmation that the thermostatic charge is lost, run System 1 under a high load and place the sensing bulb in a cup of ice water. If the superheat does not change from high to lower, then the thermostatic charge is lost. Replace the thermal expansion valve. Most times when the thermostatic charge is lost in the sensing bulb, the system will cycle off on low suction pressure. |
| Stage 2 liquid line pressure transducer out of calibration | The Stage 2 liquid line pressure transducer may have 'drifted' and is reading abnormally higher than actual pressure. Using a calibrated pressure gauge, measure the actual Stage 2 liquid line pressure and compare with the reported Stage 2 liquid line pressure. Actual Stage 2 pressure must compare within ±3 psig of the reported Stage 2 liquid line pressure. If there is a greater difference, replace the Stage 2 liquid line pressure transducer. |
| Stage 2 liquid line temperature sensor out of calibration | The Stage 2 liquid line temperature sensor may have 'drifted' and is reading abnormally lower than the actual temperature. Using a calibrated temperature sensor, measure the actual temperature on the liquid line and compare it with the reported Stage 2 liquid line temperature. If there is greater than ±2°F |

Fig. 5E

| EVENT15 - Stage 2 High Subcool Detected |
|---|
| | difference, replace the Stage 2 liquid line temperature sensor. |

| EVENT16 - Stage 2 Low Subcool Detected ||
|---|---|
| Possible Causes (listed in order of likeliness) | Recommended Solutions |
| Dirty or blocked condenser coil | The condenser coil may be dirty due to dust, sand, dirt or some other foreign debris (newspaper, a plastic bag, or cotton from a nearby cotton tree). Also inspect condenser coil for bent fin restrictions. This may foul the condenser and interfere with the heat transfer process or block airflow from entering the coil. Remove any debris from the condenser and clean the condenser coil with a commercially available coil cleaner such as NuCalgon Nu-Brite® or Simple Green or comb out bent fins on the coil as necessary. |
| Stage 2 is low on refrigerant | Stop unit and find the source of the refrigerant leak, recover remaining refrigerant, repair the leak, and recharge the system by weight to the nameplate value. If no leak is found and the Stage 2 system has the correct factory charge (confirmed by recovery and weighing in the charge), the actual operating conditions may differ from anticipated factory conditions. Add ½ lb. of refrigerant until the correct superheat and subcool values (between 10°F – 20°F) are seen during operation. Allow 15 minutes between adding charge for the system to stabilize before taking or evaluating readings. |
| Incorrectly adjusted thermal expansion valve | Close the expansion valve (turn the stem counter clockwise) ½ turn at a time until the correct superheat and subcool values (between 10°F – 20°F) are seen during operation. Allow 15 minutes between valve settings for the system to stabilize before taking or evaluating readings. |
| Poor sensing bulb location or poor bulb contact with the suction line | Check for proper location, installation, and insulation of the sensing bulb. The sensing bulb should be securely fastened to a clean straight section of the suction line and should not be |

Fig. 5F

| EVENT16 - Stage 2 Low Subcool Detected ||
|---|---|
| | influenced by ambient temperature. On lines greater tha7/8" the bulb should be installed at a 4:00 or 8 o'clock position. For smaller lines, the bulb may be located at any position with the exception of at the bottom of the line. |
| Stage 2 liquid line pressure transducer out of calibration | The Stage 2 liquid line pressure transducer may have 'drifted' and is reading abnormally lower than actual pressure. Using a calibrated pressure gauge, measure the actual Stage 2 liquid line pressure and compare with the reported Stage 2 liquid line pressure. Actual Stage 2 pressure must compare within ±3 psig of the reported Stage 2 liquid line pressure. If there is a greater difference, replace the Stage 2 liquid line pressure transducer. |
| Stage 2 liquid line temperature sensor out of calibration | The Stage 2 liquid line temperature sensor may have 'drifted' and is reading abnormally higher than the actual temperature. Using a calibrated temperature sensor, measure the actual temperature on the liquid line and compare it with the reported Stage 2 liquid line temperature. If there is greater than ±2°F difference, replace the Stage 2 liquid line temperature sensor. |
| Oversized thermal expansion valve | If all other conditions have been check and ruled out and the system still shows a low superheat and low subcool, then the actual operating conditions may differ from anticipated factory conditions and the valve may be oversized for the conditions the unit is operating in. For verification, try to increase the load on the system (increasing the return air temperature or increasing the evaporator airflow). If the expansion valve is able to modulate the superheat and subcool higher and keep it within range, then the valve may be oversized. At this point, consult with a factory service representative for assistance. |

Fig. 5G

| EVENT17 – Compressor 1 Overcurrent ||
|---|---|
| Possible Causes (listed in order of likeliness) | Recommended Solutions |
| Low line voltage or damaged motor winding | Check the amperage on all three legs. One or two high amperage legs on a three phase motor indicate an unbalanced voltage supply, or a winding imbalance which can cause motor overheating. If all three legs are not drawing approximately equal amperage, temporarily switch the leads to the motor to determine if the high leg stays with the line or stays with the terminal. If the high amperage reading stays with the line, the problem is with the line voltage supply. If the high amperage reading stays with the terminal, the problem is the motor. For low voltage on the line (high amperage reading stays with the line), check the power supply to the compressor/unit. For high amperage that stays with the line there is compressor motor damage so replace the compressor. |
| High discharge pressure with a low suction pressure | A high discharge pressure coupled with a low suction pressure represents a high compression ratio. This can result in an abnormally high amp draw situation. Check the reasons for high discharge pressure which include low or no airflow across the condenser coil and or a dirty condenser coil. Also check for abnormal operating conditions such as localized high ambient temperatures due to high sun exposure or the higher than ambient condenser air due to an external source (such as engine exhaust or a process nearby). Low suction pressure can be caused by a dirty or frozen evaporator coil or a loss of airflow across the evaporator coil. Check the evaporator blower for correct rotation and operation. Check the intake side of the coil for cleanliness and for ice and check the filters for cleanliness. |
| High Suction Pressure | Abnormally high load on the air conditioner will cause a high suction pressure (and a corresponding high discharge pressure). This high load could be caused by excessive amount of outside air entering the system, a higher than |

Fig. 6A

| EVENT 17 – Compressor 1 Overcurrent ||
|---|---|
| | expected evaporator airflow, or a higher than expected return air temperature. |
| Mechanical Compressor Damage | Internal mechanical damage to the compressor can cause the compressor from drawing overcurrent amps. This failure is usually due to an abnormal condition that caused damage to the compressor.<br>       Liquid Refrigerant Flood back – Poor airflow across the evaporator coil, thermal expansion valve failure, excessively low superheat (0°F-7°F), or poor refrigeration system piping.<br>       Excessive Compressor Cycling – more than 8-10 times per hour due to repeated low suction pressure cut outs, or repeated high discharge pressure cut out.<br>       Operation Out of Compressor Operation Envelope |

| EVENT 18 – Compressor 2 Overcurrent ||
|---|---|
| Possible Causes<br>(listed in order of likeliness) | Recommended Solutions |
| Low line voltage or damaged motor winding | Check the amperage on all three legs. One or two high amperage legs on a three phase motor indicate an unbalanced voltage supply, or a winding imbalance which can cause motor overheating. If all three legs are not drawing approximately equal amperage, temporarily switch the leads to the motor to determine if the high leg stays with the line or stays with the terminal. If the high amperage reading stays with the line, the problem is with the line voltage supply. If the high amperage reading stays with the terminal, the problem is the motor. For low voltage on the line (high amperage reading stays with the line), check the power supply to the compressor/unit. For high amperage that stays with the line there is compressor motor damage so replace the compressor. |

Fig. 6B

| EVENT18 – Compressor 2 Overcurrent ||
|---|---|
| High discharge pressure with a low suction pressure | A high discharge pressure coupled with a low suction pressure represents a high compression ratio. This can result in an abnormally high amp draw situation. Check the reasons for high discharge pressure which include low or no airflow across the condenser coil and or a dirty condenser coil. Also check for abnormal operating conditions such as localized high ambient temperatures due to high sun exposure or the higher than ambient condenser air due to an external source (such as engine exhaust or a process nearby). Low suction pressure can be caused by a dirty or frozen evaporator coil or a loss of airflow across the evaporator coil. Check the evaporator blower for correct rotation and operation. Check the intake side of the coil for cleanliness and for ice and check the filters for cleanliness. |
| High Suction Pressure | Abnormally high load on the air conditioner will cause a high suction pressure (and a corresponding high discharge pressure). This high load could be caused by excessive amount of outside air entering the system, a higher than expected evaporator airflow, or a higher than expected return air temperature. |
| Mechanical Compressor Damage | Internal mechanical damage to the compressor can cause the compressor to draw overcurrent amps. This failure is usually due to an abnormal condition that caused damage to the compressor.<br>    Liquid Refrigerant Flood back – Poor airflow across the evaporator coil, thermal expansion valve failure, excessively low superheat (0°F-7°F), or poor refrigeration system piping. Excessive Compressor Cycling – more than 8-10 times per hour due to repeated low suction pressure cut outs, or repeated high discharge pressure cut out. Operation Out of Compressor Operation Envelope |

Fig. 6C

| EVENT19 – Condenser Motor 1 Overcurrent ||
|---|---|
| Possible Causes (listed in order of likeliness) | Recommended Solutions |
| Low line voltage or damaged motor winding | Check the amperage on all three legs. One or two high amperage legs on a three phase motor indicate an unbalanced voltage supply, or a winding imbalance which can cause motor overheating. If all three legs are not drawing approximately equal amperage, temporarily switch the leads to the motor to determine if the high leg stays with the line or stays with the terminal. If the high amperage reading stays with the line, the problem is with the line voltage supply. If the high amperage reading stays with the terminal, the problem is the motor. For low voltage on the line (high amperage reading stays with the line), check the power supply to the motor. For high amperage that stays with the line there is compressor motor damage so replace the compressor. |
| Mechanical Motor Damage | Internal mechanical damage to the motor can cause the motor from drawing overcurrent amps. Most likely mechanical failure of the motor is due to damage to the bearings. Check for bearing failure (front and rear bearings). Bearing failure may be due to lack of lubrication, improper loading (over tightened belt), or due to moisture in the bearing. The motor needs to be replaced or rebuilt. |
| Motor Overloaded | The motor may be overloaded due to the fan drawing more horsepower than the motor can supply. This can be confirmed by partially blocking the intake or discharge of the fan. If the current draw of the fan drops below the full load amps, then the fan is overloading the motor. At this point, consult with a factory service representative for assistance. |

Fig. 6D

| EVENT20 – Condenser Motor 2 Overcurrent ||
|---|---|
| Possible Causes (listed in order of likeliness) | Recommended Solutions |
| Low line voltage or damaged motor winding | Check the amperage on all three legs. One or two high amperage legs on a three phase motor indicate an unbalanced voltage supply, or a winding imbalance which can cause motor overheating. If all three legs are not drawing approximately equal amperage, temporarily switch the leads to the motor to determine if the high leg stays with the line or stays with the terminal. If the high amperage reading stays with the line, the problem is with the line voltage supply. If the high amperage reading stays with the terminal, the problem is the motor. For low voltage on the line (high amperage reading stays with the line), check the power supply to the motor. For high amperage that stays with the line there is compressor motor damage so replace the compressor. |
| Mechanical Motor Damage | Internal mechanical damage to the motor can cause the motor from drawing overcurrent amps. Most likely mechanical failure of the motor is due to damage to the bearings. Check for bearing failure (front and rear bearings). Bearing failure may be due to lack of lubrication, improper loading, or due to moisture in the bearing. The motor needs to be replaced or rebuilt. |
| Motor Overloaded | The motor may be overloaded due to the fan drawing more horsepower than the motor can supply. This can be confirmed by partially blocking the intake or discharge of the fan. If the current draw of the fan drops below the full load amps, then the fan is overloading the motor. At this point, consult with a factory service representative for assistance. |

Fig. 6E

| EVENT21 – Evaporator Motor 1 Overcurrent ||
|---|---|
| Possible Causes (listed in order of likeliness) | Recommended Solutions |
| Low line voltage or damaged motor winding | Check the amperage on all three legs. One or two high amperage legs on a three phase motor indicate an unbalanced voltage supply, or a winding imbalance which can cause motor overheating. If all three legs are not drawing approximately equal amperage, temporarily switch the leads to the motor to determine if the high leg stays with the line or stays with the terminal. If the high amperage reading stays with the line, the problem is with the line voltage supply. If the high amperage reading stays with the terminal, the problem is the motor. For low voltage on the line (high amperage reading stays with the line), check the power supply to the motor. For high amperage that stays with the line there is compressor motor damage so replace the compressor. |
| Mechanical Motor Damage | Internal mechanical damage to the motor can cause the motor from drawing overcurrent amps. Most likely mechanical failure of the motor is due to damage to the bearings. Check for bearing failure (front and rear bearings). Bearing failure may be due to lack of lubrication, improper loading, or due to moisture in the bearing. The motor needs to be replaced or rebuilt. |
| Motor Overloaded | The motor may be overloaded due to the wheel drawing more horsepower than the motor can supply. This can be confirmed by partially blocking the intake or discharge of the fan. If the current draw of the fan drops below the full load amps, then the fan is overloading the motor. At this point, consult with a factory service representative for assistance. |

Fig. 6F

| EVENT22 – Evaporator Motor 2 Overcurrent ||
|---|---|
| Possible Causes<br>(listed in order of likeliness) | Recommended Solutions |
| Low line voltage or damaged motor winding | Check the amperage on all three legs. One or two high amperage legs on a three phase motor indicate an unbalanced voltage supply, or a winding imbalance which can cause motor overheating. If all three legs are not drawing approximately equal amperage, temporarily switch the leads to the motor to determine if the high leg stays with the line or stays with the terminal. If the high amperage reading stays with the line, the problem is with the line voltage supply. If the high amperage reading stays with the terminal, the problem is the motor. For low voltage on the line (high amperage reading stays with the line), check the power supply to the motor. For high amperage that stays with the line there is compressor motor damage so replace the compressor. |
| Mechanical Motor Damage | Internal mechanical damage to the motor can cause the motor from drawing overcurrent amps. Most likely mechanical failure of the motor is due to damage to the bearings. Check for bearing failure (front and rear bearings). Bearing failure may be due to lack of lubrication, improper loading, or due to moisture in the bearing. The motor needs to be replaced or rebuilt. |
| Motor Overloaded | The motor may be overloaded due to the wheel drawing more horsepower than the motor can supply. This can be confirmed by partially blocking the intake or discharge of the fan. If the current draw of the fan drops below the full load amps, then the fan is overloading the motor. At this point, consult with a factory service representative for assistance. |

Fig. 6G

| EVENT23 – Evaporator Motor 3 Overcurrent ||
|---|---|
| Possible Causes <br> (listed in order of likeliness) | Recommended Solutions |
| Low line voltage or damaged motor winding | Check the amperage on all three legs. One or two high amperage legs on a three phase motor indicate an unbalanced voltage supply, or a winding imbalance which can cause motor overheating. If all three legs are not drawing approximately equal amperage, temporarily switch the leads to the motor to determine if the high leg stays with the line or stays with the terminal. If the high amperage reading stays with the line, the problem is with the line voltage supply. If the high amperage reading stays with the terminal, the problem is the motor. For low voltage on the line (high amperage reading stays with the line), check the power supply to the motor. For high amperage that stays with the line there is compressor motor damage so replace the compressor. |
| Mechanical Motor Damage | Internal mechanical damage to the motor can cause the motor from drawing overcurrent amps. Most likely mechanical failure of the motor is due to damage to the bearings. Check for bearing failure (front and rear bearings). Bearing failure may be due to lack of lubrication, improper loading, or due to moisture in the bearing. The motor needs to be replaced or rebuilt. |
| Motor Overloaded | The motor may be overloaded due to the wheel drawing more horsepower than the motor can supply. This can be confirmed by partially blocking the intake or discharge of the fan. If the current draw of the fan drops below the full load amps, then the fan is overloading the motor. At this point, consult with a factory service representative for assistance. |

Fig. 6H

| EVENT24 – Heater 1 Overcurrent ||
|---|---|
| Possible Causes (listed in order of likeliness) | Recommended Solutions |
| High line voltage | Check the amperage on all three legs for a three phase system or on the single leg of a single phase system. If all three legs are not drawing approximately equal amperage, temporarily switch the leads to the heater element to determine if the high amp leg stays with the line or stays with the element. If the high amperage reading stays with the line, the problem is with the line voltage supply. If the high amperage reading stays with the heater element, the problem is the heater element. For high voltage on the line (high amperage reading stays with the line), check the power supply to the heater element. For high amperage that stays with the line the heater element, check all the connections to the element. If all the connections are secure, replace the element. |

| EVENT25 – Heater 2 Overcurrent ||
|---|---|
| Possible Causes (listed in order of likeliness) | Recommended Solutions |
| High line voltage | Check the amperage on all three legs for a three phase system or on the single leg of a single phase system. If all three legs are not drawing approximately equal amperage, temporarily switch the leads to the heater element to determine if the high amp leg stays with the line or stays with the element. If the high amperage reading stays with the line, the problem is with the line voltage supply. If the high amperage reading stays with the heater element, the problem is the heater element. For high voltage on the line (high amperage reading stays with the line), check the power supply to the heater element. For high amperage that stays with the line the heater element, check all the connections to the element. If all the connections are secure, replace the element. |

Fig. 6I

| EVENT26 – Purge Motor 1 Overcurrent ||
|---|---|
| Possible Causes<br>(listed in order of likeliness) | Recommended Solutions |
| Low line voltage or damaged motor winding | Check the amperage on all three legs. One or two high amperage legs on a three phase motor indicate an unbalanced voltage supply, or a winding imbalance which can cause motor overheating. If all three legs are not drawing approximately equal amperage, temporarily switch the leads to the motor to determine if the high leg stays with the line or stays with the terminal. If the high amperage reading stays with the line, the problem is with the line voltage supply. If the high amperage reading stays with the terminal, the problem is the motor. For low voltage on the line (high amperage reading stays with the line), check the power supply to the motor. For high amperage that stays with the line there is compressor motor damage so replace the compressor. |
| Mechanical Motor Damage | Internal mechanical damage to the motor can cause the motor from drawing overcurrent amps. Most likely mechanical failure of the motor is due to damage to the bearings. Check for bearing failure (front and rear bearings). Bearing failure may be due to lack of lubrication, improper loading, or due to moisture in the bearing. The motor needs to be replaced or rebuilt. |
| Motor Overloaded | The motor may be overloaded due to the wheel drawing more horsepower than the motor can supply. This can be confirmed by partially blocking the intake or discharge of the fan. If the current draw of the fan drops below the full load amps, then the fan is overloading the motor. At this point, consult with a factory service representative for assistance. |

Fig. 7A

| EVENT27 – Purge Motor 2 Overcurrent ||
|---|---|
| Possible Causes (listed in order of likeliness) | Recommended Solutions |
| Low line voltage or damaged motor winding | Check the amperage on all three legs. One or two high amperage legs on a three phase motor indicate an unbalanced voltage supply, or a winding imbalance which can cause motor overheating. If all three legs are not drawing approximately equal amperage, temporarily switch the leads to the motor to determine if the high leg stays with the line or stays with the terminal. If the high amperage reading stays with the line, the problem is with the line voltage supply. If the high amperage reading stays with the terminal, the problem is the motor. For low voltage on the line (high amperage reading stays with the line), check the power supply to the motor. For high amperage that stays with the line there is compressor motor damage so replace the compressor. |
| Mechanical Motor Damage | Internal mechanical damage to the motor can cause the motor from drawing overcurrent amps. Most likely mechanical failure of the motor is due to damage to the bearings. Check for bearing failure (front and rear bearings). Bearing failure may be due to lack of lubrication, improper loading, or due to moisture in the bearing. The motor needs to be replaced or rebuilt. |
| Motor Overloaded | The motor may be overloaded due to the wheel drawing more horsepower than the motor can supply. This can be confirmed by partially blocking the intake or discharge of the fan. If the current draw of the fan drops below the full load amps, then the fan is overloading the motor. At this point, consult with a factory service representative for assistance. |

Fig. 7B

| EVENT28 – Low fresh air flow ||
|---|---|
| Possible Causes (listed in order of likeliness) | Recommended Solutions |
| Dirty fresh air filter | Check for a dirty fresh air filter. If the filter is dirty, clean or replace the filter. |
| Blocked fresh air intake | If the filter is clean, check for a blockage in the fresh air duct system. This could include a foreign blockage such as trash, debris, or even due to an animal such as a birds nest. |
| Fresh airflow air flow sensor is reading incorrectly | The pressure transducer may have 'drifted' and is reading abnormally lower than change in pressure across the sensor. Using a calibrated pressure gauge, measure the actual differential pressure and compare with the reported change in pressure from the sensor. |

| EVENT29 – Low discharge air flow ||
|---|---|
| Possible Causes (listed in order of likeliness) | Recommended Solutions |
| Failed evaporator motor or evaporator motor contactor or overload | Check that that all evaporator motor(s) and evaporator motor contactor(s) are engaged when the unit is on. If one or more evaporator motors do not engage the discharge air will be low or non-existent. If the motor does not engage check the evaporator motor starter(s), overloads, and the motor(s). A low supply airflow alarm will likely be accompanied with a high supply temperature alarm and/or a low building pressure alarm (Type X, Y or Z Purge only). |
| Dirty return air filter and/or dirty fresh air filter | Check the cleanliness of both the return air filter and the fresh air filter. In order for the supply air flow to be low due to a dirty filter, both filters need to be blocked. If only one filter is dirty, the evaporator blower(s) will draw more airflow from the clean filter. If both filter are blocked due to dirt or an obstruction, clean or replace the filters. |
| Blocked outlet | Check the outlet duct of the unit and verify there is no blockage. For ducted systems, the blockage could be caused by detached insulation in the ductwork or closed supply |

Fig. 7C

| EVENT29 – Low discharge air flow ||
|---|---|
| | grilles that have been adjusted to the closed position. |
| Blocked inlet | The inlet to the blower could be blocked by some large obstruction such as insulation or rag. |
| Failed back draft damper | For redundant units that have back draft dampers, check that the back draft dampers are functioning. One or more could be stuck in the open position and allow for recirculation in the system. |
| Blower wheel failure | Check each evaporator blower wheel to ensure there is no damage to the wheel. Bent or missing blades can cause the fan to underperform. |
| Dirty or blocked evaporator coil | The evaporator coil may be dirty due to dust, sand, dirt or some other foreign debris (insulation, a plastic bag, or cotton from a nearby cotton tree). Also inspect evaporator coil for bent fin restrictions. This may foul the evaporator and restrict airflow entering the coil. Remove any debris from the evaporator and clean the coil with a commercially available coil cleaner such as NuCalgon Nu-Brite® or Simple Green or comb out bent fins on the coil as necessary. |
| Discharge airflow air flow sensor is reading incorrectly | The pressure transducer may have 'drifted' and is reading abnormally lower than change in pressure across the sensor. Using a calibrated pressure gauge, measure the actual differential pressure and compare with the reported change in pressure from the sensor. |

| EVENT30 – Low room pressure ||
|---|---|
| Possible Causes (listed in order of likeliness) | Recommended Solutions |
| Excessive leakage in the building | The building has excessive leakage causing air to escape faster than the unit can add to it. This can be due to an open door, window or other opening. Check cable, wire, or pipe penetrations and the construction of the building to ensure there are no large cracks where air could escape. If the building has a pressure relief damper, check to make sure it is |

Fig. 7D

| EVENT30 – Low room pressure ||
|---|---|
| | set correctly to maintain pressure in the building. |
| Dirty fresh air filter | Check the fresh air filter. If it is dirty or blocked the unit will not be able to being air into the building to pressurize it. Clean or replace the filter. |
| Dirty or blocked evaporator coil | The evaporator coil may be dirty due to dust, sand, dirt or some other foreign debris (insulation, a plastic bag, or cotton from a nearby cotton tree). Also inspect evaporator coil for bent fin restrictions. This may foul the evaporator and restrict airflow entering the coil. Remove any debris from the condenser and clean the condenser coil with a commercially available coil cleaner such as NuCalgon, Nu-Brite®, or Simple Green or comb out bent fins on the coil as necessary. |
| Room pressure sensor is reading incorrectly | The room pressure transducer may have 'drifted' and is reading abnormally lower than actual pressure. Using a calibrated pressure gauge, measure the actual pressure and compare with the reported pressure from the sensor. |

| EVENT31 – High Room Temperature ||
|---|---|
| Possible Causes (listed in order of likeliness) | Recommended Solutions |
| Faulty programmable/digital thermostat, sensor or incorrect parameters | Look at the thermostat to verify that the screen appears to be on. If not, verify if there is control power present at the power terminals of the device. If control power is present, replace the faulty device. If the screen is on, verify if the thermostat is calling for cool and that the relay output for the compressor stage is energized (according to the screen). If not, first verify that sensor is reading the indoor temperature properly. If not, replace the sensor. If reading proper temperature, verify all initial factory parameters are set per the tag or label provided with the HVAC and that the cooling set point is set at least 4 degrees F (2 degrees C) below the indoor temperature (to verify function). If device is calling for cool, verify the relay or |

Fig. 7E

| EVENT31 – High Room Temperature ||
|---|---|
| | output feeding the compressor has control power to the input (relay common terminal) and whether or not it is outputting the proper control voltage. If control power is present at the input and the output voltage is non-existent or abnormally low, replace the faulty thermostat. |
| Faulty A/C enable switch or mechanical thermostat (for general purpose interiors) | Verify the dial indicator for the thermostat is set several degrees below the indoor room temperature (to verify function) and that the A/C enable switch is set to the "On" or "Auto" position. Verify if the device is receiving control power to the common terminal(s) of the thermostat switch(es). If not, check if there is any other switch upstream from the device (other than the A/C enable switch) and verify the switch is in the "On" position and if it is receiving and passing the control power to and through the A/C enable switch to the device. If the either switch is on or in auto, receiving control power and not passing the control power through the switch, replace faulty switch. If control power is present through the switch(es), replace the faulty device. |
| Faulty A/C enable switch or mechanical thermostat (for intrinsically safe or non-incendive circuits) | Verify the dial indicator for the thermostat is set several degrees below the indoor room temperature (to verify function) and that the A/C enable switch is set to the "On" or "Auto" position. Check if there is any other switch or switches upstream from the device and verify it is in the "On" position. Note: These are intrinsically safe or non-incendive circuits so control power will not be present. If all switches upstream are on, and if it is safe to do so, de-energize the equipment. Once de-energized, begin verifying continuity through all switches including the device switch(es) feeding the cooling circuit(s). Replace any device that is not completing the circuit. |

Fig. 7F

EVENT32 – High discharge air temperature

| Possible Causes (listed in order of likeliness) | Recommended Solutions |
|---|---|
| Space thermostat is set too high | Check thermostat to verify that it is set at the appropriate setting. |
| Cooling portion of the unit is not functioning | Check for alarms on the compressor unit or refrigerant system. If this alarm is active, it is likely that something else has malfunctioned and another alarm is active. Some examples are compressor failed to start, low refrigerant, or dirty coils. |
| Heater system is stuck on | Heater contactor may be stuck in the on state, causing the air to be heated constantly. |

EVENT33 – High incoming voltage

| Possible Causes (listed in order of likeliness) | Recommended Solutions |
|---|---|
| High Incoming voltage | Check panel board where incoming voltage originates. If the voltage is more than 5% above the rated voltage (over 504 for a 480VAC system), contact site electrical engineer to investigate the cause of the spike. |

EVENT34 – Stage 1 high discharge pressure

| Possible Causes (listed in order of likeliness) | Recommended Solutions |
|---|---|
| Dirty or blocked condenser coil | The condenser coil may be dirty due to dust, sand, dirt or some other foreign debris (newspaper, a plastic bag, or cotton from a nearby cotton tree). Also inspect condenser coil for bent fin restrictions. This may foul the condenser and interfere with the heat transfer process or block airflow from entering the coil. Remove any debris from the condenser and clean the condenser coil with a commercially available coil cleaner such as NuCalgon, Nu-Brite®, or Simple Green or comb out bent fins on the coil as necessary. |
| Failed condenser fan or failed condenser fan motor | Check the condenser fan to verify it is rotating and rotating in the right direction and there is no damage to the fan itself. If the fan is not rotating, check the condenser fan contactor, |

Fig. 7G

| EVENT34 – Stage 1 high discharge pressure ||
|---|---|
| | overload, or motor for damage. |
| High refrigerant charge or blockage in the refrigeration system. | A higher than normal refrigerant charge can cause a high discharge pressure. Check correct charge level by measuring the superheat and subcool levels. A subcool value larger than 20 will indicate an overcharge. |
| Stage 1 discharge line pressure transducer out of calibration | The Stage 1 discharge line pressure transducer may have 'drifted' and is reading abnormally higher than actual pressure. Using a calibrated pressure gauge, measure the actual Stage 1 discharge line pressure and compare with the reported Stage 1 discharge line pressure. Actual Stage 1 discharge line pressure must compare within ±3 psig of the reported Stage 1 discharge line pressure. If there is a greater difference, replace the Stage 1 discharge line pressure transducer. |

| EVENT35 – Stage 2 high discharge pressure ||
|---|---|
| Possible Causes (listed in order of likeliness) | Recommended Solutions |
| Dirty or blocked condenser coil | The condenser coil may be dirty due to dust, sand, dirt or some other foreign debris (newspaper, a plastic bag, or cotton from a nearby cotton tree). Also inspect condenser coil for bent fin restrictions. This may foul the condenser and interfere with the heat transfer process or block airflow from entering the coil. Remove any debris from the condenser and clean the condenser coil with a commercially available coil cleaner such as NuCalgon Nu-Brite® or Simple Green or comb out bent fins on the coil as necessary. |
| Failed condenser fan or failed condenser fan motor | Check the condenser fan to verify it is rotating and rotating in the right direction and there is no damage to the fan itself. If the fan is not rotating, check the condenser fan contactor, overload, or motor for damage. |
| High refrigerant charge or blockage in the refrigeration system. | A higher than normal refrigerant charge can cause a high discharge pressure. Check correct charge level by measuring the superheat and |

Fig. 7H

| EVENT35 – Stage 2 high discharge pressure ||
|---|---|
| | subcool levels. A subcool value larger than 20 will indicate an overcharge. |
| Stage 2 discharge line pressure transducer out of calibration | The Stage 2 discharge line pressure transducer may have 'drifted' and is reading abnormally higher than actual pressure. Using a calibrated pressure gauge, measure the actual Stage 2 discharge line pressure and compare with the reported Stage 2 discharge line pressure. Actual Stage 2 discharge line pressure must compare within ±3 psig of the reported Stage 2 discharge line pressure. If there is a greater difference, replace the Stage 2 discharge line pressure transducer. |

Fig. 71

| EVENT36 – Stage 1 low suction pressure ||
|---|---|
| Possible Causes (listed in order of likeliness) | Recommended Solutions |
| Dirty return air filter | Check the cleanliness the return air filter. Dirty filter will decrease air flow and cause low suction pressure. Clean or replace the filter(s). |
| Failed evaporator blower fan or blower fan motor | One or more of the evaporator fans has failed, resulting in insufficient air flow across the evaporator coils. Check the evaporator blowers to verify it is rotating and rotating in the right direction and there is no damage to the blower wheels themselves. If a blower wheel is not rotating, check the blower contactor, overload, or motor for damage. |
| Dirty or blocked evaporator coil | The evaporator coil may be dirty due to dust, sand, dirt or some other foreign debris (insulation, a plastic bag, or cotton from a nearby cotton tree). Also inspect evaporator coil for bent fin restrictions. This may foul the evaporator and restrict airflow entering the coil. Remove any debris from the evaporator and clean the coil with a commercially available coil cleaner such as NuCalgon, Nu-Brite®, or Simple Green or comb out bent fins on the coil as necessary. |
| Low refrigerant charge or loss of refrigerant charge | Check alarms and verify that there is a considerable amount of pressure in the system. A lower than normal refrigerant charge can cause a low suction pressure. Check for refrigerant leaks. If a leak is found, see owner's manual for corrective action. If not, check correct charge level by measuring the superheat and subcool levels and add refrigerant as necessary. |
| Stage 1 suction pressure transducer out of calibration | The Stage 1 suction line pressure transducer may have 'drifted' and is reading abnormally lower than actual pressure. Using a calibrated pressure gauge, measure the actual Stage 1 suction pressure and compare with the reported Stage 1 suction pressure. Actual Stage 1 pressure must compare within ±3 psig of the reported Stage 1 suction pressure. If there is a greater difference, replace the Stage 1 suction pressure transducer. |

Fig. 8A

| EVENT37 – Stage 2 low suction pressure ||
|---|---|
| Possible Causes<br>(listed in order of likeliness) | Recommended Solutions |
| Dirty return air filter | Check the cleanliness the return air filter. Dirty filter will decrease air flow and cause low suction pressure. Clean or replace the filter(s). |
| Failed evaporator blower fan or blower fan motor | One or more of the evaporator fans has failed, resulting in insufficient air flow across the evaporator coils. Check the evaporator blowers to verify it is rotating and rotating in the right direction and there is no damage to the blower wheels themselves. If a blower wheel is not rotating, check the blower contactor, overload, or motor for damage. |
| Dirty or blocked evaporator coil | The evaporator coil may be dirty due to dust, sand, dirt or some other foreign debris (insulation, a plastic bag, or cotton from a nearby cotton tree). Also inspect evaporator coil for bent fin restrictions. This may foul the evaporator and restrict airflow entering the coil. Remove any debris from the evaporator and clean the coil with a commercially available coil cleaner such as NuCalgon Nu-Brite® or Simple Green or comb out bent fins on the coil as necessary. |
| Low refrigerant charge or loss of refrigerant charge | Check alarms and verify that there is a considerable amount of pressure in the system. A lower than normal refrigerant charge can cause a low suction pressure. Check for refrigerant leaks. If a leak is found, see owner's manual for corrective action. If not, check correct charge level by measuring the superheat and subcool levels and add refrigerant as necessary. |
| Stage 2 suction pressure transducer out of calibration | The Stage 2 suction line pressure transducer may have 'drifted' and is reading abnormally lower than actual pressure. Using a calibrated pressure gauge, measure the actual Stage 2 suction pressure and compare with the reported Stage 2 suction pressure. Actual Stage 2 pressure must compare within ±3 psig of the reported Stage 2 suction pressure. If there is a greater difference, replace the Stage 2 suction pressure transducer. |

Fig. 8B

EVENT38 – Stage 1 compressor short cycling

| Possible Causes (listed in order of likeliness) | Recommended Solutions |
| --- | --- |
| Faulty time delay relay, short cycle module or time delay setting | Verify time delay setting is set for 2 to 3 minutes. If setting is correct and the compressor still energizes immediately every time cooling is called for, replace the time delay relay or anti-short cycling module. |
| Leaky Building | Check to make sure all shelter doors, windows, and other egress points are closed and sealed. |
| Air-conditioners capacity is too great for the internal heat load or design loads | Certain equipment within the space may be de-energized and not creating the internal heat load the HVAC was initially sized for or the HVAC was not sized correctly for the load. Consult with a factory service representative for assistance if needed. |

EVENT39 – Stage 2 compressor short cycling

| Possible Causes (listed in order of likeliness) | Recommended Solutions |
| --- | --- |
| Faulty time delay relay, short cycle module or time delay setting | Verify time delay setting is set for 2 to 3 minutes. If setting is correct and the compressor still energizes immediately every time cooling is called for, replace the time delay relay or anti-short cycling module. |
| Leaky Building | Check to make sure all shelter doors, windows, and other egress points are closed and sealed. |
| Air-conditioners capacity is too great for the internal heat load or design loads | Certain equipment within the space may be de-energized and not creating the internal heat load the HVAC was initially sized for or the HVAC was not sized correctly for the design load. Consult with a factory service representative for assistance if needed. |

Fig. 8C

EVENT40 – Compressor motor 1 contactor reached cycle limit

| Possible Causes (listed in order of likeliness) | Recommended Solutions |
|---|---|
| Contactor life expectancy reached | Replace contactor and reset contactor cycle limit in the system setup screen. |

EVENT41 – Compressor motor 2 contactor reached cycle limit

| Possible Causes (listed in order of likeliness) | Recommended Solutions |
|---|---|
| Contactor life expectancy reached | Replace contactor and reset contactor cycle limit in the system setup screen. |

EVENT42 – Evaporator motor 1 contactor reached cycle limit

| Possible Causes (listed in order of likeliness) | Recommended Solutions |
|---|---|
| Contactor life expectancy reached | Replace contactor and reset contactor cycle limit in the system setup screen. |

EVENT43 – Evaporator motor 2 contactor reached cycle limit

| Possible Causes (listed in order of likeliness) | Recommended Solutions |
|---|---|
| Contactor life expectancy reached | Replace contactor and reset contactor cycle limit in the system setup screen. |

EVENT44 – Evaporator motor 3 contactor reached cycle limit

| Possible Causes (listed in order of likeliness) | Recommended Solutions |
|---|---|
| Contactor life expectancy reached | Replace contactor and reset contactor cycle limit in the system setup screen. |

EVENT45 – Heater 1 contactor reached cycle limit

| Possible Causes (listed in order of likeliness) | Recommended Solutions |
|---|---|
| Contactor life expectancy reached | Replace contactor and reset contactor cycle limit in the system setup screen. |

Fig. 8D

EVENT46 – Heater 2 contactor reached cycle limit

| Possible Causes (listed in order of likeliness) | Recommended Solutions |
|---|---|
| Contactor life expectancy reached | Replace contactor and reset contactor cycle limit in the system setup screen. |

EVENT47 – Condenser motor 1 contactor reached cycle limit

| Possible Causes (listed in order of likeliness) | Recommended Solutions |
|---|---|
| Contactor life expectancy reached | Replace contactor and reset contactor cycle limit in the system setup screen. |

EVENT48 – Condenser motor 2 contactor reached cycle limit

| Possible Causes (listed in order of likeliness) | Recommended Solutions |
|---|---|
| Contactor life expectancy reached | Replace contactor and reset contactor cycle limit in the system setup screen. |

EVENT49 – Purge motor 1 contactor reached cycle limit

| Possible Causes (listed in order of likeliness) | Recommended Solutions |
|---|---|
| Contactor life expectancy reached | Replace contactor and reset contactor cycle limit in the system setup screen. |

EVENT50 – Purge motor 2 contactor reached cycle limit

| Possible Causes (listed in order of likeliness) | Recommended Solutions |
|---|---|
| Contactor life expectancy reached | Replace contactor and reset contactor cycle limit in the system setup screen. |

Fig. 8E

| EVENT51 – Compressor motor 1 run failure ||
|---|---|
| Possible Causes (listed in order of likeliness) | Recommended Solutions |
| Compressor safety is open | Check refrigerant alarms to verify that refrigerant system is operating within safe pressure and temperature limits, including frost control and low and high refrigerant pressure. Replace faulty safety device is all system register normal. |
| Control power fuse blown | Locate control power fuse by tracing from control power transformer's secondary terminals to fuse holder. Pull out blown fuse, and replace with an identically sized fuse. |
| Thermostat / humidistat failure | Look at the thermostat and humidistats to verify that their power is on. If control power is verified at the power terminals of the thermostat and humidistat, and one or both of the screens do not power on, replace the faulty thermostat or humidistat. |

| EVENT52 – Compressor motor 2 run failure ||
|---|---|
| Possible Causes (listed in order of likeliness) | Recommended Solutions |
| Compressor safety is open | Check refrigerant alarms to verify that refrigerant system is operating within safe pressure and temperature limits, including frost control and low and high refrigerant pressure. Replace faulty safety device is all system register normal. |
| Control power fuse blown | Locate control power fuse by tracing from control power transformer's secondary terminals to fuse holder. Pull out blown fuse, and replace with an identically sized fuse. |
| Thermostat / humidistat failure | Look at the thermostat and humidistats to verify that their power is on. If control power is verified at the power terminals of the thermostat and humidistat, and one or both of the screens do not power on, replace the faulty thermostat or humidistat. |

Fig. 8F

EVENT53 – Evaporator motor 1 run failure

| Possible Causes (listed in order of likeliness) | Recommended Solutions |
|---|---|
| Tripped overload | Locate motor overload directly below contactor and reset. |
| Control power fuse blown | Locate control power fuse by tracing from control power transformer's secondary terminals to fuse holder. Pull out blown fuse, and replace with an identically sized fuse. |

EVENT54 – Evaporator motor 2 run failure

| Possible Causes (listed in order of likeliness) | Recommended Solutions |
|---|---|
| Tripped overload | Locate motor overload directly below contactor and reset. |
| Control power fuse blown | Locate control power fuse by tracing from control power transformer's secondary terminals to fuse holder. Pull out blown fuse, and replace with an identically sized fuse. |

EVENT55 – Evaporator motor 3 run failure

| Possible Causes (listed in order of likeliness) | Recommended Solutions |
|---|---|
| Tripped overload | Locate motor overload directly below contactor and reset. |
| Control power fuse blown | Locate control power fuse by tracing from control power transformer's secondary terminals to fuse holder. Pull out blown fuse, and replace with an identically sized fuse. |

Fig. 8G

| EVENT56 – Heater 1 run failure ||
| Possible Causes (listed in order of likeliness) | Recommended Solutions |
| --- | --- |
| Heater safety is open | Check heater thermal cut out and high limit thermostat setting and verify that maximum temperature had not been exceeded. Replace faulty safety device is all system register normal. |
| Control power fuse blown | Locate control power fuse by tracing from control power transformer's secondary terminals to fuse holder. Pull out blown fuse, and replace with an identically sized fuse. |
| Thermostat / humidistat failure | Look at the thermostat and humidistats to verify that their power is on. If control power is verified at the power terminals of the thermostat and humidistat, and one or both of the screens do not power on, replace the faulty thermostat or humidistat. |

| EVENT57 – Heater 2 run failure ||
| Possible Causes (listed in order of likeliness) | Recommended Solutions |
| --- | --- |
| Heater safety is open | Check heater thermal cut out and high limit thermostat setting and verify that maximum temperature had not been exceeded. Replace faulty safety device is all system register normal. |
| Control power fuse blown | Locate control power fuse by tracing from control power transformer's secondary terminals to fuse holder. Pull out blown fuse, and replace with an identically sized fuse. |
| Thermostat / humidistat failure | Look at the thermostat and humidistats to verify that their power is on. If control power is verified at the power terminals of the thermostat and humidistat, and one or both of the screens do not power on, replace the faulty thermostat or humidistat. |

| EVENT58 – Condenser motor 1 run failure ||
| Possible Causes (listed in order of likeliness) | Recommended Solutions |
| --- | --- |
| Tripped overload | Locate motor overload directly below contactor and reset. |
| Control power fuse blown | Locate control power fuse by tracing from |

Fig. 9A

| EVENT58 – Condenser motor 1 run failure ||
|---|---|
| | control power transformer's secondary terminals to fuse holder. Pull out blown fuse, and replace with an identically sized fuse. |
| Thermostat / humidistat failure | Look at the thermostat and humidistats to verify that their power is on. If control power is verified at the power terminals of the thermostat and humidistat, and one or both of the screens do not power on, replace the faulty thermostat or humidistat. |

| EVENT59 – Condenser motor 2 run failure ||
|---|---|
| Possible Causes (listed in order of likeliness) | Recommended Solutions |
| Tripped overload | Locate motor overload directly below contactor and reset. |
| Control power fuse blown | Locate control power fuse by tracing from control power transformer's secondary terminals to fuse holder. Pull out blown fuse, and replace with an identically sized fuse. |
| Thermostat / humidistat failure | Look at the thermostat and humidistats to verify that their power is on. If control power is verified at the power terminals of the thermostat and humidistat, and one or both of the screens do not power on, replace the faulty thermostat or humidistat. |

| EVENT60 – Purge motor 1 run failure ||
|---|---|
| Possible Causes (listed in order of likeliness) | Recommended Solutions |
| Tripped overload | Locate motor overload directly below contactor and reset. |
| Control power fuse blown | Locate control power fuse by tracing from control power transformer's secondary terminals to fuse holder. Pull out blown fuse, and replace with an identically sized fuse. |

Fig. 9B

| EVENT61 – Purge motor 2 run failure ||
|---|---|
| Possible Causes (listed in order of likeliness) | Recommended Solutions |
| Tripped overload | Locate motor overload directly below contactor and reset. |
| Control power fuse blown | Locate control power fuse by tracing from control power transformer's secondary terminals to fuse holder. Pull out blown fuse, and replace with an identically sized fuse. |

| EVENT62 – Compressor motor 1 contactor failure ||
|---|---|
| Possible Causes (listed in order of likeliness) | Recommended Solutions |
| Contactor stuck closed | If the contactor would not open after control power signal is removed, the contactor has failed. Replace contactor and reset contactor cycle limit in the system setup screen. |
| Contactor would not close | If the contactor does receive control power on its coil terminals but the contactor would not close, then the contactor coil has failed. Replace contactor and reset contactor cycle limit in the system setup screen. |

| EVENT63 – Compressor motor 2 contactor failure ||
|---|---|
| Possible Causes (listed in order of likeliness) | Recommended Solutions |
| Contactor stuck closed | If the contactor would not open after control power signal is removed, the contactor has failed. Replace contactor and reset contactor cycle limit in the system setup screen. |
| Contactor would not close | If the contactor does receive control power on its coil terminals but the contactor would not close, then the contactor coil has failed. Replace contactor and reset contactor cycle limit in the system setup screen. |

Fig. 9C

EVENT64 – Evaporator motor 1 contactor failure

| Possible Causes (listed in order of likeliness) | Recommended Solutions |
| --- | --- |
| Contactor stuck closed | If the contactor would not open after control power signal is removed, the contactor has failed. Replace contactor and reset contactor cycle limit in the system setup screen. |
| Contactor would not close | If the contactor does receive control power on its coil terminals but the contactor would not close, then the contactor coil has failed. Replace contactor and reset contactor cycle limit in the system setup screen. |

EVENT65 – Evaporator motor 2 contactor failure

| Possible Causes (listed in order of likeliness) | Recommended Solutions |
| --- | --- |
| Contactor stuck closed | If the contactor would not open after control power signal is removed, the contactor has failed. Replace contactor and reset contactor cycle limit in the system setup screen. |
| Contactor would not close | If the contactor does receive control power on its coil terminals but the contactor would not close, then the contactor coil has failed. Replace contactor and reset contactor cycle limit in the system setup screen. |

EVENT66 – Evaporator motor 3 contactor failure

| Possible Causes (listed in order of likeliness) | Recommended Solutions |
| --- | --- |
| Contactor stuck closed | If the contactor would not open after control power signal is removed, the contactor has failed. Replace contactor and reset contactor cycle limit in the system setup screen. |
| Contactor would not close | If the contactor does receive control power on its coil terminals but the contactor would not close, then the contactor coil has failed. Replace contactor and reset contactor cycle limit in the system setup screen. |

Fig. 9D

| EVENT67 – Heater 1 contactor failure ||
|---|---|
| Possible Causes (listed in order of likeliness) | Recommended Solutions |
| Contactor stuck closed | If the contactor would not open after control power signal is removed, the contactor has failed. Replace contactor and reset contactor cycle limit in the system setup screen. |
| Contactor would not close | If the contactor does receive control power on its coil terminals but the contactor would not close, then the contactor coil has failed. Replace contactor and reset contactor cycle limit in the system setup screen. |

| EVENT68 – Heater 2 contactor failure ||
|---|---|
| Possible Causes (listed in order of likeliness) | Recommended Solutions |
| Contactor stuck closed | If the contactor would not open after control power signal is removed, the contactor has failed. Replace contactor and reset contactor cycle limit in the system setup screen. |
| Contactor would not close | If the contactor does receive control power on its coil terminals but the contactor would not close, then the contactor coil has failed. Replace contactor and reset contactor cycle limit in the system setup screen. |

| EVENT69 – Condenser motor 1 contactor failure ||
|---|---|
| Possible Causes (listed in order of likeliness) | Recommended Solutions |
| Contactor stuck closed | If the contactor would not open after control power signal is removed, the contactor has failed. Replace contactor and reset contactor cycle limit in the system setup screen. |
| Contactor would not close | If the contactor does receive control power on its coil terminals but the contactor would not close, then the contactor coil has failed. Replace contactor and reset contactor cycle limit in the system setup screen. |

Fig. 9E

| EVENT70 – Condenser motor 2 contactor failure ||
|---|---|
| Possible Causes (listed in order of likeliness) | Recommended Solutions |
| Contactor stuck closed | If the contactor would not open after control power signal is removed, the contactor has failed. Replace contactor and reset contactor cycle limit in the system setup screen. |
| Contactor would not close | If the contactor does receive control power on its coil terminals but the contactor would not close, then the contactor coil has failed. Replace contactor and reset contactor cycle limit in the system setup screen. |

| EVENT71 – Purge motor 1 contactor failure ||
|---|---|
| Possible Causes (listed in order of likeliness) | Recommended Solutions |
| Contactor stuck closed | If the contactor would not open after control power signal is removed, the contactor has failed. Replace contactor and reset contactor cycle limit in the system setup screen. |
| Contactor would not close | If the contactor does receive control power on its coil terminals but the contactor would not close, then the contactor coil has failed. Replace contactor and reset contactor cycle limit in the system setup screen. |

| EVENT72 – Purge motor 2 contactor failure ||
|---|---|
| Possible Causes (listed in order of likeliness) | Recommended Solutions |
| Contactor stuck closed | If the contactor would not open after control power signal is removed, the contactor has failed. Replace contactor and reset contactor cycle limit in the system setup screen. |
| Contactor would not close | If the contactor does receive control power on its coil terminals but the contactor would not close, then the contactor coil has failed. Replace contactor and reset contactor cycle limit in the system setup screen. |

Fig. 9F

| EVENT73 – Voltage imbalance ||
|---|---|
| Possible Causes (listed in order of likeliness) | Recommended Solutions |
| Voltage Imbalance | Check panel board where incoming voltage originates. If one or more legs of the three phase voltage is more than 5% above or below the rated voltage (over 504 or under 456 for a 480VAC system), contact site electrical engineer to investigate the cause of the imbalance. |

| EVENT74 – Low voltage ||
|---|---|
| Possible Causes (listed in order of likeliness) | Recommended Solutions |
| Low Voltage | Check panel board where incoming voltage originates. If the voltage is more than 5% below the rated voltage (under 456 for a 480VAC system), contact site electrical engineer to investigate the cause of the dip. |

| EVENT75 – Phase loss ||
|---|---|
| Possible Causes (listed in order of likeliness) | Recommended Solutions |
| Phase Loss | Check panel board where incoming voltage originates. If any one leg of the three phase voltage is missing, contact site electrical engineer to investigate the cause of the fault. |

| EVENT76 – Control power failure ||
|---|---|
| Possible Causes (listed in order of likeliness) | Recommended Solutions |
| Control Power Off | Check control power permissives such as customer shutdown contacts, phase monitor contacts, and remote control panel permissive contacts. |
| Control Power Transformer Faulty | Replace control power transformer. |
| Blown Control Power Fuse | Replace control power fuse. |
| Faulty Phase Monitor | Replace phase monitor. |

Fig. 9G

| EVENT77 – Low room temperature ||
|---|---|
| Possible Causes <br> (listed in order of likeliness) | Recommended Solutions |
| Faulty programmable/digital thermostat, sensor or incorrect parameters | Look at the thermostat to verify that the screen appears to be on. If not, verify if there is control power present at the power terminals of the device. If control power is present, replace the faulty device. If the screen is on, verify if the thermostat is calling for heat and that the relay output for the heater stage is energized (according to the screen). If not, first verify that sensor is reading the indoor temperature properly. If not, replace the sensor. If reading proper temperature, verify all initial factory parameters are set per the tag or label provided with the HVAC and that the heating set point is set at least 4 degrees F (2 degrees C) above the indoor temperature (to verify function). If device is calling for heat, verify the relay or output feeding the compressor has control power to the input (relay common terminal) and whether or not it is outputting the proper control voltage. If control power is present at the input and the output voltage is non-existent or abnormally low, replace the faulty thermostat. |
| Faulty A/C enable switch or mechanical thermostat (for general purpose interiors) | Verify the dial indicator for the thermostat is set several degrees above the indoor room temperature (to verify function) and that the A/C enable switch is set to the "On" or "Auto" position. Verify if the device is receiving control power to the common terminal(s) of the thermostat switch(es). If not, check if there is any other switch upstream from the device (other than the A/C enable switch) and verify the switch is in the "On" position and if it is receiving and passing the control power to and through the A/C enable switch to the device. If the either switch is on or in auto, receiving control power and not passing the control power through the switch, replace faulty switch. If control power is present through the switch(es), replace the faulty device. |
| Faulty A/C enable switch or mechanical thermostat (for intrinsically safe or non- | Verify the dial indicator for the thermostat is set several degrees above the indoor room |

Fig. 9H

| EVENT77 – Low room temperature ||
|---|---|
| incendive circuits) | temperature (to verify function) and that the A/C enable switch is set to the "On" or "Auto" position. Check if there is any other switch or switches upstream from the device and verify it is in the "On" position. Note: These are intrinsically safe or non-incendive circuits so control power will not be present. If all switches upstream are on, and if it is safe to do so, de-energize the equipment. Once de-energized, begin verifying continuity through all switches including the device switch(es) feeding the heating circuit(s). Replace any device that is not completing the circuit. |

| EVENT78 – Dirty pre-filter ||
|---|---|
| Possible Causes (listed in order of likeliness) | Recommended Solutions |
| Dirty pre-filter | Replace dirty filter. |

| EVENT79 – Dirty post-filter ||
|---|---|
| Possible Causes (listed in order of likeliness) | Recommended Solutions |
| Dirty post-filter | Replace dirty filter. |

Fig. 9I

| EVENT80 – High Humidity ||
|---|---|
| Possible Causes (listed in order of likeliness) | Recommended Solutions |
| Faulty programmable/digital humidistat, sensor or incorrect parameters | Look at the humidistat to verify that the screen appears to be on. If not, verify if there is control power present at the power terminals of the device. If control power is present, replace the faulty device. If the screen is on, verify if the humidistat is calling for cool and that the relay output for the compressor stage is energized (according to the screen). If not, first verify that sensor is reading the indoor humidity properly. If not, replace the sensor. If reading proper humidity, verify all initial factory parameters are set per the tag or label provided with the HVAC and that the dehumidify set point is set at least 15% relative humidity below the indoor humidity (to verify function). If device is calling for dehumidify, verify the relay or output feeding the compressor has control power to the input (relay common terminal) and whether or not it is outputting the proper control voltage. If control power is present at the input and the output voltage is non-existent or abnormally low, replace the faulty humidistat. |
| Faulty A/C enable switch or mechanical de-humidistat (for general purpose interiors) | Verify the dial indicator for the de-humidistat is set at least 10% below the indoor room humidity (to verify function) and that the A/C enable switch is set to the "On" or "Auto" position. Verify if the device is receiving control power to the common terminal of the de-humidistat switch. If not, check if there is any other switch upstream from the device (other than the A/C enable switch) and verify the switch is in the "On" position and if it is receiving and passing the control power to and through the A/C enable switch to the device. If the either switch is on or in auto, receiving control power and not passing the control power through the switch, replace faulty switch. If control power is present through the switch(es), replace the faulty device. |
| Faulty A/C enable switch or mechanical de-humidistat (for intrinsically safe or non- | Verify the dial indicator for the de-humidistat is set at least 10% below the indoor room humidity |

Fig. 10A

| EVENT80 – High Humidity ||
|---|---|
| incendive circuits) | (to verify function) and that the A/C enable switch is set to the "On" or "Auto" position. Check if there is any other switch or switches upstream from the device and verify it is in the "On" position. Note: <u>These are intrinsically safe or non-incendive circuits so control power will not be present.</u> If all switches upstream are on, and if it is safe to do so, de-energize the equipment. Once de-energized, begin verifying continuity through all switches including the device switch(es) feeding the cooling circuit(s). Replace any device that is not completing the circuit. |

| EVENT81 – Stage 1 discharge line temperature reading error ||
|---|---|
| Possible Causes (listed in order of likeliness) | Recommended Solutions |
| Verify all Wiring Connections | Verify continuity of all wire connections, terminal connections, and splices. |
| RTD failure | Check the resistance of the sensing element to verify that the reading is within tolerance of RTD chart, if not, replace the RTD. |
| PLC RTD module failure | If RTD replacement does not fix the problem, check the RTD module of the PLC, and verify that it is operational. If not, replace the module. |

| EVENT82 – Stage 1 liquid line temperature reading error ||
|---|---|
| Possible Causes (listed in order of likeliness) | Recommended Solutions |
| Verify all Wiring Connections | Verify continuity of all wire connections, terminal connections, and splices. |
| RTD failure | Check the resistance of the sensing element to verify that the reading is within tolerance of RTD chart, if not, replace the RTD. |
| PLC RTD module failure | If RTD replacement does not fix the problem, check the RTD module of the PLC, and verify that it is operational. If not, replace the module. |

Fig. 10B

EVENT83 – Stage 1 suction line temperature reading error

| Possible Causes (listed in order of likeliness) | Recommended Solutions |
|---|---|
| Verify all Wiring Connections | Verify continuity of all wire connections, terminal connections, and splices. |
| RTD failure | Check the resistance of the sensing element to verify that the reading is within tolerance of RTD chart, if not, replace the RTD. |
| PLC RTD module failure | If replacement does not fix the problem, check the RTD module of the PLC, and verify that it is operational. If not, replace the module. |

EVENT84 – Stage 2 discharge line temperature reading error

| Possible Causes (listed in order of likeliness) | Recommended Solutions |
|---|---|
| Verify all Wiring Connections | Verify continuity of all wire connections, terminal connections, and splices. |
| RTD failure | Check the resistance of the sensing element to verify that the reading is within tolerance of RTD chart, if not, replace the RTD. |
| PLC RTD module failure | If replacement does not fix the problem, check the RTD module of the PLC, and verify that it is operational. If not, replace the module. |

EVENT85 – Stage 2 liquid line temperature reading error

| Possible Causes (listed in order of likeliness) | Recommended Solutions |
|---|---|
| Verify all Wiring Connections | Verify continuity of all wire connections, terminal connections, and splices. |
| RTD failure | Check the resistance of the sensing element to verify that the reading is within tolerance of RTD chart, if not, replace the RTD. |
| PLC RTD module failure | If replacement does not fix the problem, check the RTD module of the PLC, and verify that it is operational. If not, replace the module. |

EVENT86 – Stage 2 suction line temperature reading error

| Possible Causes (listed in order of likeliness) | Recommended Solutions |
|---|---|
| Verify all Wiring Connections | Verify continuity of all wire connections, |

Fig. 10C

EVENT86 – Stage 2 suction line temperature reading error

|  |  |
|---|---|
|  | terminal connections, and splices. |
| RTD failure | Check the resistance of the sensing element to verify that the reading is within tolerance of RTD chart, if not, replace the RTD. |
| PLC RTD module failure | If replacement does not fix the problem, check the RTD module of the PLC, and verify that it is operational. If not, replace the module. |

EVENT87 – Stage 1 discharge line pressure reading error

| Possible Causes (listed in order of likeliness) | Recommended Solutions |
|---|---|
| Verify all Wiring Connections | Verify continuity of all wire connections, terminal connections, and splices. |
| Transducer failure | Replace the pressure transducer. |
| PLC AI module failure | If transducer replacement does not fix the problem, check the AI module of the PLC, and verify that it is operational. If not, replace the module. |

EVENT88 – Stage 1 liquid line pressure reading error

| Possible Causes (listed in order of likeliness) | Recommended Solutions |
|---|---|
| Verify all Wiring Connections | Verify continuity of all wire connections, terminal connections, and splices. |
| Transducer failure | Replace the pressure transducer. |
| PLC AI module failure | If transducer replacement does not fix the problem, check the AI module of the PLC, and verify that it is operational. If not, replace the module. |

Fig. 10D

EVENT89 – Stage 1 suction line pressure reading error

| Possible Causes (listed in order of likeliness) | Recommended Solutions |
|---|---|
| Verify all Wiring Connections | Verify continuity of all wire connections, terminal connections, and splices. |
| Transducer failure | Replace the pressure transducer. |
| PLC AI module failure | If transducer replacement does not fix the problem, check the AI module of the PLC, and verify that it is operational. If not, replace the module. |

EVENT90 – Stage 2 discharge line pressure reading error

| Possible Causes (listed in order of likeliness) | Recommended Solutions |
|---|---|
| Verify all Wiring Connections | Verify continuity of all wire connections, terminal connections, and splices. |
| Transducer failure | Replace the pressure transducer. |
| PLC AI module failure | If transducer replacement does not fix the problem, check the AI module of the PLC, and verify that it is operational. If not, replace the module. |

EVENT91 – Stage 2 liquid line pressure reading error

| Possible Causes (listed in order of likeliness) | Recommended Solutions |
|---|---|
| Verify all Wiring Connections | Verify continuity of all wire connections, terminal connections, and splices. |
| Transducer failure | Replace the pressure transducer. |
| PLC AI module failure | If transducer replacement does not fix the problem, check the AI module of the PLC, and verify that it is operational. If not, replace the module. |

EVENT92 – Stage 2 suction line pressure reading error

| Possible Causes (listed in order of likeliness) | Recommended Solutions |
|---|---|
| Verify all Wiring Connections | Verify continuity of all wire connections, terminal connections, and splices. |
| Transducer failure | Replace the pressure transducer. |

Fig. 10E

| EVENT92 – Stage 2 suction line pressure reading error ||
|---|---|
| PLC AI module failure | If transducer replacement does not fix the problem, check the AI module of the PLC, and verify that it is operational. If not, replace the module. |

| EVENT93 – Fresh air flow transmitter reading error ||
|---|---|
| Possible Causes (listed in order of likeliness) | Recommended Solutions |
| Verify all Wiring Connections | Verify continuity of all wire connections, terminal connections, and splices. |
| Transmitter failure | Replace the differential pressure transmitter. |
| PLC AI module failure | If transmitter replacement does not fix the problem, check the AI module of the PLC, and verify that it is operational. If not, replace the module. |

| EVENT94 – Building pressure transmitter reading error ||
|---|---|
| Possible Causes (listed in order of likeliness) | Recommended Solutions |
| Verify all Wiring Connections | Verify continuity of all wire connections, terminal connections, and splices. |
| Transmitter failure | Replace the differential pressure transmitter. |
| PLC AI module failure | If transmitter replacement does not fix the problem, check the AI module of the PLC, and verify that it is operational. If not, replace the module. |

| EVENT95 – Supply air flow transmitter reading error ||
|---|---|
| Possible Causes (listed in order of likeliness) | Recommended Solutions |
| Verify all Wiring Connections | Verify continuity of all wire connections, terminal connections, and splices. |
| Transmitter failure | Replace the differential pressure transmitter. |
| PLC AI module failure | If transmitter replacement does not fix the problem, check the AI module of the PLC, and verify that it is operational. If not, replace the module. |

Fig. 10F

EVENT96 – Fresh air pre-filter transmitter reading error

| Possible Causes (listed in order of likeliness) | Recommended Solutions |
|---|---|
| Verify all Wiring Connections | Verify continuity of all wire connections, terminal connections, and splices. |
| Transmitter failure | Replace the differential pressure transmitter. |
| PLC AI module failure | If transmitter replacement does not fix the problem, check the AI module of the PLC, and verify that it is operational. If not, replace the module. |

EVENT97 – Fresh air post filter transmitter reading error

| Possible Causes (listed in order of likeliness) | Recommended Solutions |
|---|---|
| Verify all Wiring Connections | Verify continuity of all wire connections, terminal connections, and splices. |
| Transmitter failure | Replace the differential pressure transmitter. |
| PLC AI module failure | If transmitter replacement does not fix the problem, check the AI module of the PLC, and verify that it is operational. If not, replace the module. |

Fig. 10G

| EVENT98 – Evaporator motor run amps uptrend ||
|---|---|
| Possible Causes (listed in order of likeliness) | Recommended Solutions |
| Air filters dirty | Air filters are dirty causing the evaporator motors to draw more amperes to maintain air flow. Replace air filters. |
| Bearings wearing out | Motor bearings are beginning to wear out, replace or rebuild motor at next scheduled maintenance. |

| EVENT99 – Voltage spike / sag at power source ||
|---|---|
| Possible Causes (listed in order of likeliness) | Recommended Solutions |
| Loose wire at upstream circuit breaker | Wire connection at power circuit breaker may be loose due to vibration. Check and tighten wires at next scheduled maintenance. |
| Power irregularities at source | Power supply irregularities may be generated by various upstream high power motors and drives. Add a power transformer to feed the HVAC circuit or add a low pass power filter to power source at next scheduled maintenance. |

| EVENT100 – Air flow / pressurization low at unit A ||
|---|---|
| Possible Causes (listed in order of likeliness) | Recommended Solutions |
| Air filters dirty | Air filters are dirty causing the evaporator to lose air flow. Replace air filters. |
| Duct blockage near unit A | There may be debris inside ductwork near unit A blocking air flow. Open and check duct work at next scheduled maintenance. |

| EVENT101 – Scheduled stack rain cap clean up ||
|---|---|
| Possible Causes (listed in order of likeliness) | Recommended Solutions |
| Scheduled stack rain cap clean up | Annual reminder to clear stack rain cap of debris such as flying paper, trash, and other blockage due to plant operation. |

Fig. 10H

METHOD AND APPARATUS FOR MONITORING AND TROUBLESHOOTING OF HVAC EQUIPMENT

CROSS REFERENCE TO RELATED APPLICATIONS

This application claims the benefit of priority under 35 U.S.C. § 120 and is a continuation of pending application Ser. No. 14/879,322 entitled "Method and Apparatus for Monitoring and Troubleshooting of HVAC Equipment" filed Oct. 9, 2015 which takes priority from a provisional application for patent entitled "Method and Apparatus for Monitoring and Troubleshooting of HVAC Equipment" having Ser. No. 62/061,765 filed Oct. 9, 2014. Both are incorporated as if fully set forth herein.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of system maintenance and more specifically to a Method and Apparatus For Monitoring and Troubleshooting of HVAC Equipment.

BRIEF SUMMARY OF THE INVENTION

The primary advantage of the invention is to provide a system for monitoring heating and cooling systems and machinery on a real time basis and provide troubleshooting guides to users based on sensed parameters.

Another advantage of the invention is to provide real time data on the performance of heating, ventilation, air conditioning, and refrigeration systems.

Another advantage of the invention is to provide sensors that shall be integrated into a programmable logic controller (PLC) which shall process the data and establish alarm levels and trigger points for preventive maintenance and troubleshooting activities.

Another advantage of the invention is to provide a customer multiple interfaces including a local HMI and/or provide the ability to tie into a customer's DCS or SCADA system.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIGS. 3A through 3I are display screens for event information according to a preferred embodiment of the invention.

FIGS. 4A through 4H are display screens for event information according to a preferred embodiment of the invention.

FIGS. 5A through 5G are display screens for event information according to a preferred embodiment of the invention.

FIGS. 6A through 6I are display screens for event information according to a preferred embodiment of the invention.

FIGS. 7A through 7I are display screens for event information according to a preferred embodiment of the invention.

FIGS. 8A through 8G are display screens for event information according to a preferred embodiment of the invention.

FIGS. 9A through 9I are display screens for event information according to a preferred embodiment of the invention.

FIGS. 10A through 10H are display screens for event information according to a preferred embodiment of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for later filed claims and as a representative basis for teaching one skilled in the art to employ the present invention in virtually any appropriately detailed system, structure or manner.

The HVAC Monitoring system of the present invention in a preferred embodiment is a strap on system that provides real time data on the performance of heating, ventilation, air conditioning, and refrigeration systems. Additionally, the system may apply to filtration, purge, and pressurization systems. The core of the system is the instrumentation of the equipment using various sensing methods that shall include discrete (on/off) and analog (flow, humidity, pressure and temperature) sensing systems. These sensors are integrated into a programmable logic controller (PLC) which processes the data and establishes alarm levels and trigger points for maintenance activities. The system shall provide for multiple customer interfaces including a local HMI and/or provide the ability to tie into a customer's DCS or SCADA system. Additionally, the system shall be designed to be integrated with an SAS designed SCADA system. Further, the system has various troubleshooting alarms and preventive maintenance events for users to efficiently manage problems at an early stage. The alarms and events provide a series of displayed solutions to a particular problem enabling the user to fix the system without third party intervention.

As is readily apparent, multiple HVAC units may be monitored by this system and present warnings or trigger events to a user from a number of units. The display information can be configured to respond to a plurality of units being monitored and supply troubleshooting instructions for each of the monitored units.

Figure 1:
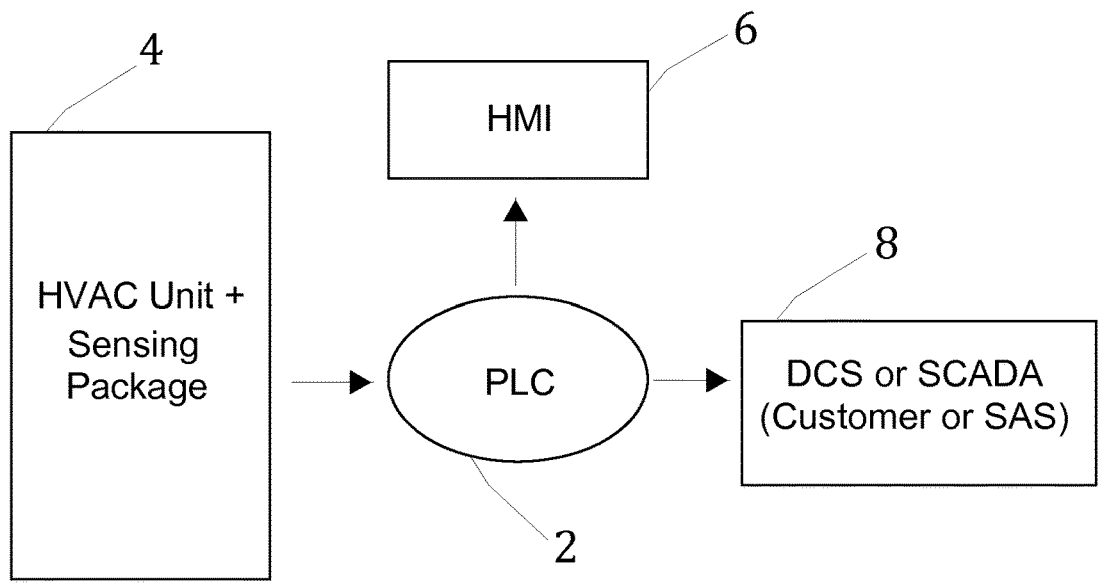
FIG. 1 is a block diagram showing system components according to a preferred embodiment of the invention.

FIG. 1 shows a block diagram of the interaction of a preferred embodiment of the present invention with a monitored system. PLC 2 receives raw sensor data from the monitored HVAC system and Sensing Package 4 and processes the date into useable digital data. PLC 2 establishes alarm and preventive maintenance after hours or "PM" levels as well. HVAC Unit and Sensing Package 4 is connected to the various equipment and sends the raw data to PLC 2. PLC 2 in turn sends data to HMI 6 for local display of all monitored points and alarms. PLC 2 may also send data to a customer designed or custom DCS or SCADA system 8 for graphic display of all monitored point and alarms.

A preferred embodiment of the system has a series of sensors including, but not limited to, system monitoring sensors for the following parameters:
Airflow/Differential Pressure;
Discharge/Supply Air Flow;
Fresh Air/Stack Air Flow;
Room Pressure (before filter);
Stack Pre-Filter Pressure; and
Stack Post-Filter Pressure.

The system may also have motor sensors including the following:
Evaporator Motor Current Transducer (CT);
Condenser Motor Current Transducer (CT);
Purge/Pressurization Motor Current Transducer (CT);
Compressor Current Transducer (CT); and
Heating Element Current Transducer (CT).

The system may additionally have refrigerant system sensors including the following:
Suction Pressure(s);
Suction Temperature(s);
Liquid Line Pressure(s);
Liquid Line Temperature(s);
Discharge Line Temperature(s); and
Discharge Line Pressure(s).

Additionally the system may have general performance sensors including the following:
Room/Return Air Temperature(s)/RH;
Discharge/Supply Air Temperature;
Discharge/Supply Air RH;
Room/Return Air Temperature/RH;
Fresh Air Temperature/Fresh Air RH;
Unit Incoming Voltage;
Unit Incoming Phase (dry contact); and
Unit Total Current.

Turning now to FIGS. 2A through 2F, a schematic 10 of a representative wiring diagram of a monitoring system of the present invention is shown. Panel 12 includes a programmable logic array 11 and display 13 for processing data collected from the HVAC system being monitored. Panel 12 is connected by Ethernet cable 14 to Ethernet switch 26. Panel 12 is powered through lines 16 through junction block 18 which in turn is connected to fuse time delay 20, connected to power supply 22 which is in turn connected via fuse time delay 24 to a power grid or electrical outlet.

Ethernet switch 26 is interconnected via cable 28 which connects to Ethernet adapter 38 via connecting identifier A from FIG. 4A to 4B. A series of input modules 40, 44, 46, 48, 50, 52, and 54 are connected as further described below.

Power is supplied to Ethernet adapter 38 via lines 30, as well as supplied to strips 56 and 58.

Input module 40 is connected via identifier D by a ribbon cable 70 which connects to terminal block module 72. IDEC modules 74 are connected to strip 76 which in turn are connected to system shutdown signal to evaporator 78, blower signal 80, stage 1 cooling signal 81, stage 1 heating signal 82, stage 1 condenser fan cycle signal 84 and common side of control power transformer 86.

Ethernet cable 32 via identifier C is connected to an automation system terminal block module 60 which is in turn connected via Ethernet cable 62 to a second automation system terminal block module 64 connected by Ethernet cable 66 to power monitoring module 68.

Figure 2A:
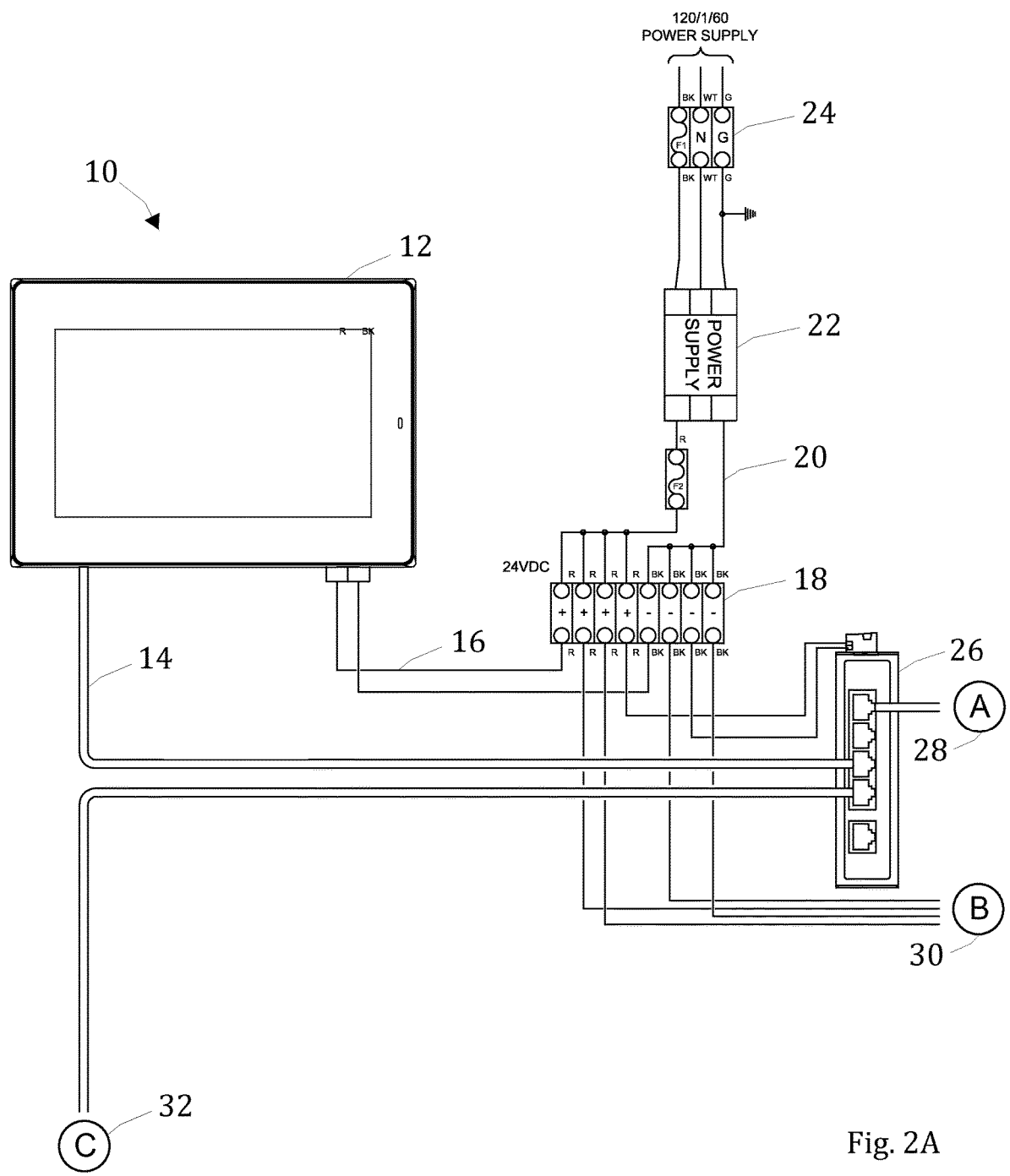
FIG. 2A through 2F are a schematic diagram of wiring to an HVAC system according to a preferred embodiment of the invention.
Figure 2B:
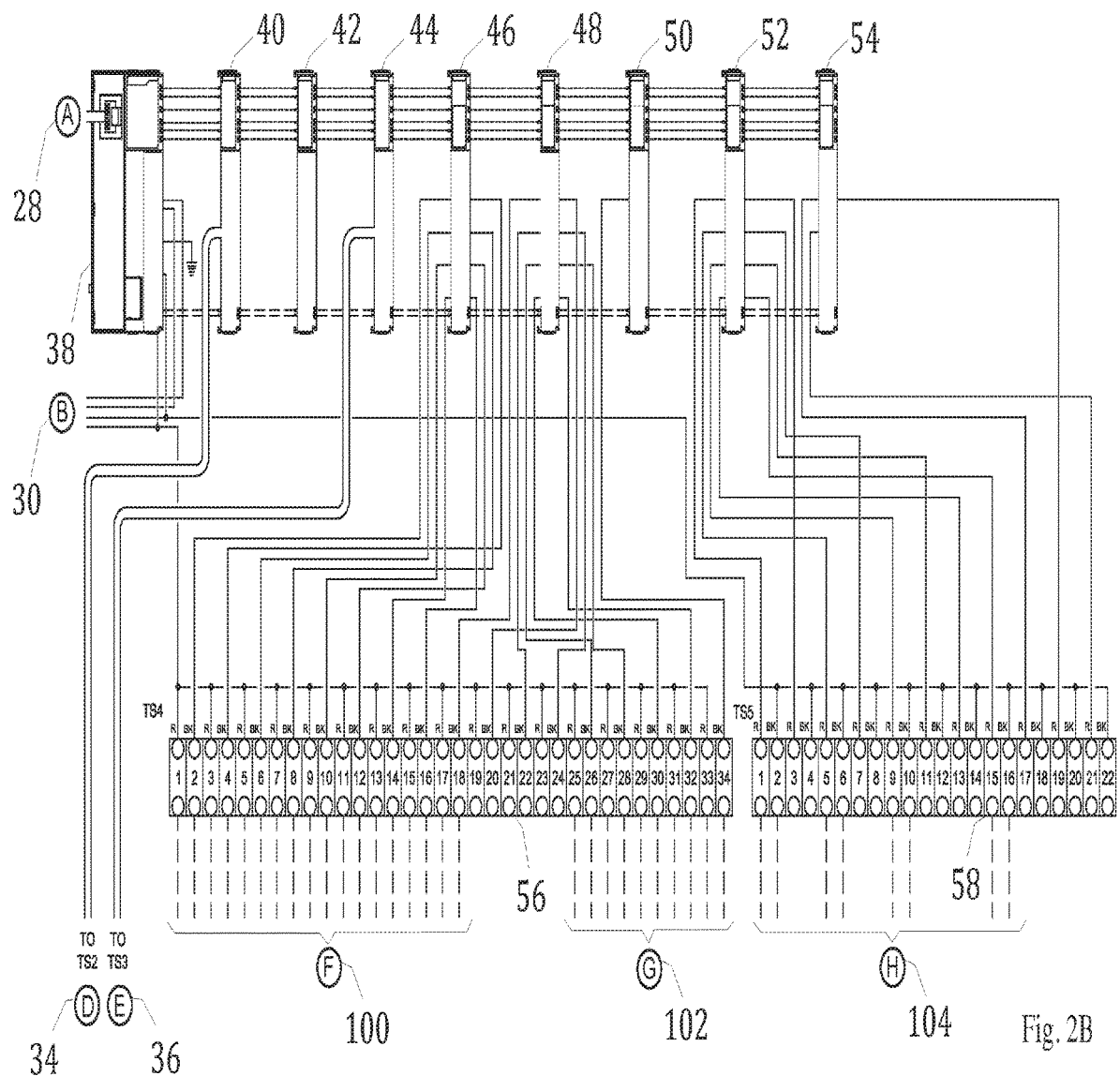
Figure 2C:
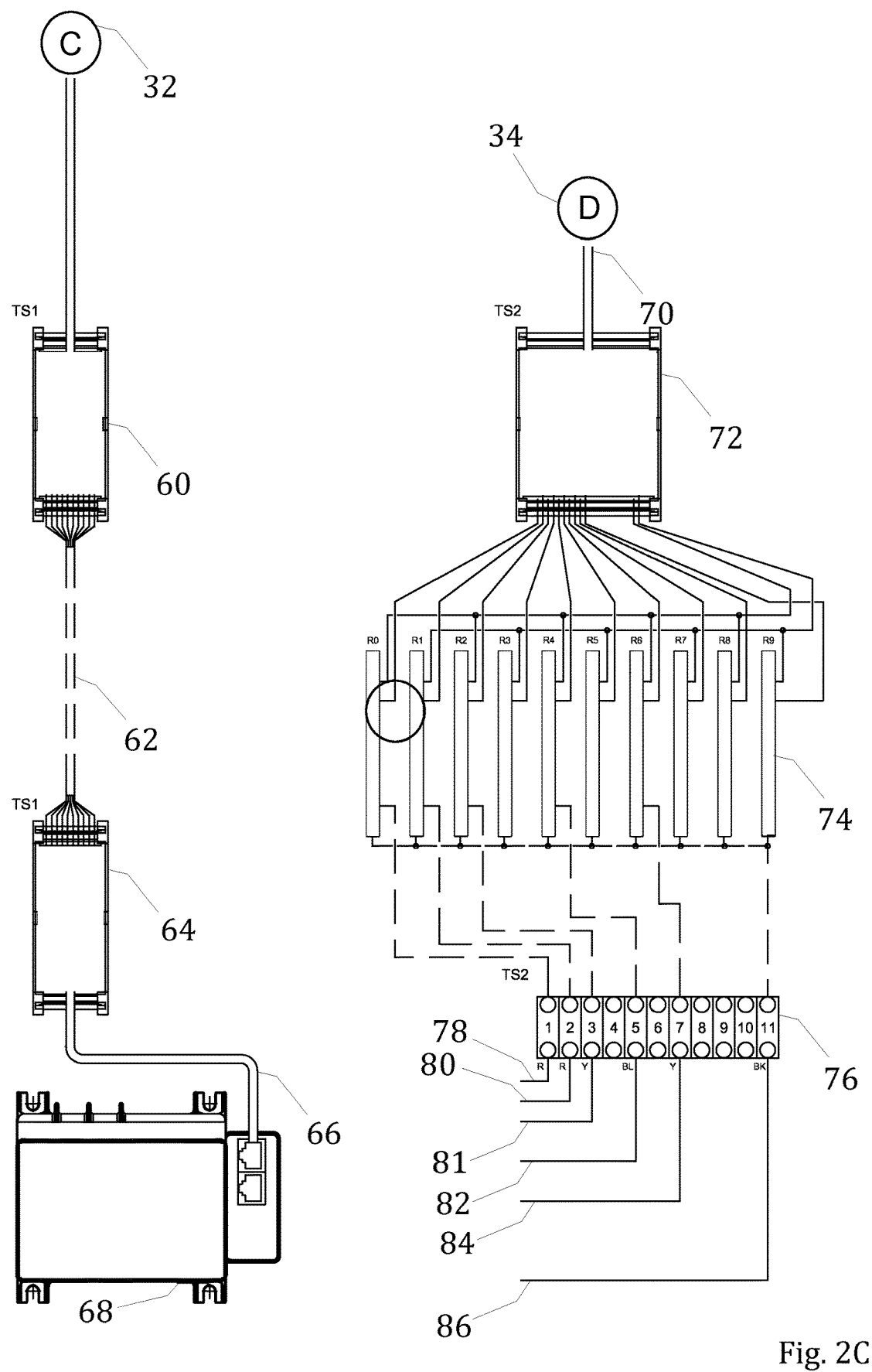
Figure 2D:
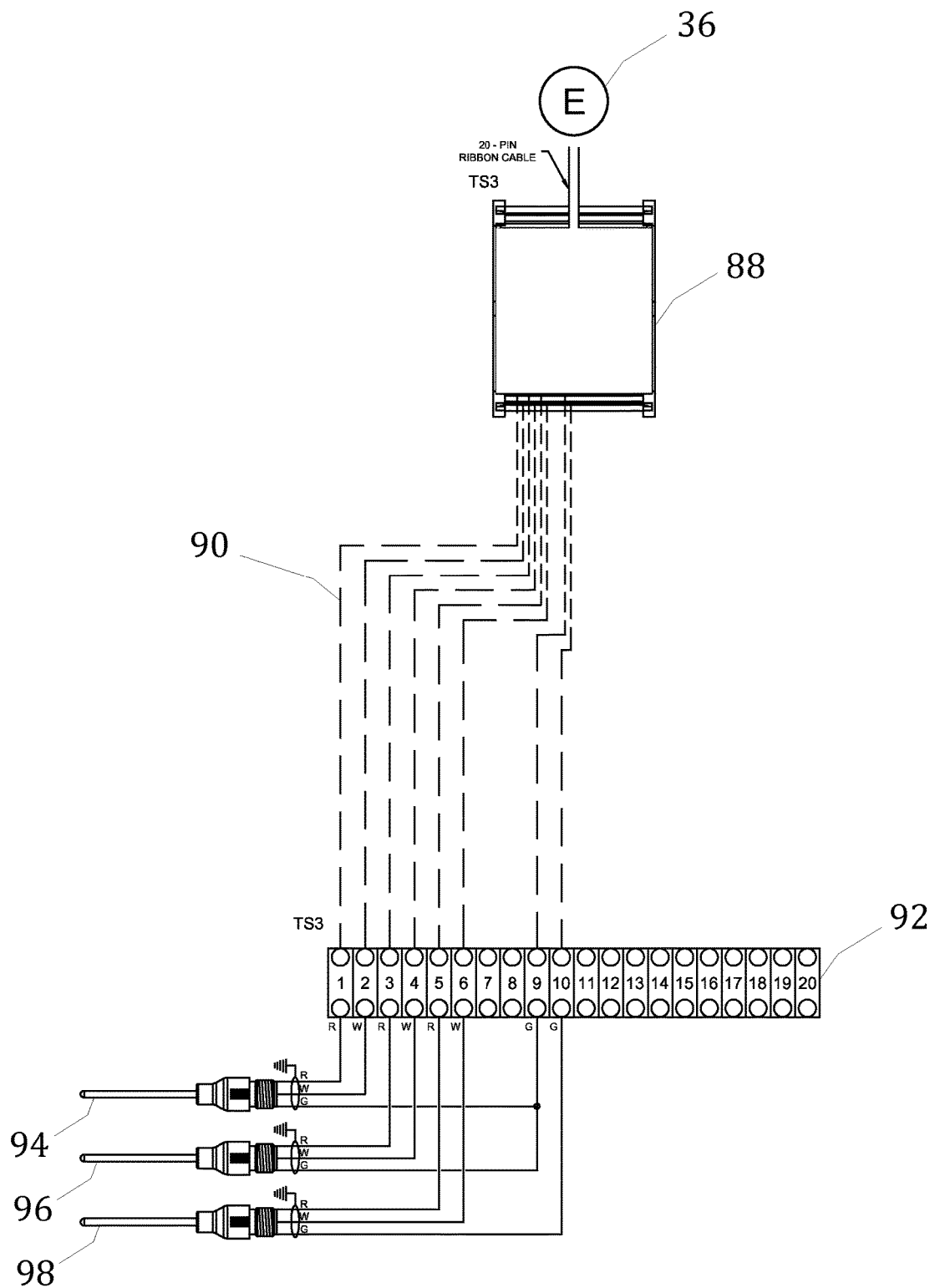
Figure 2E:
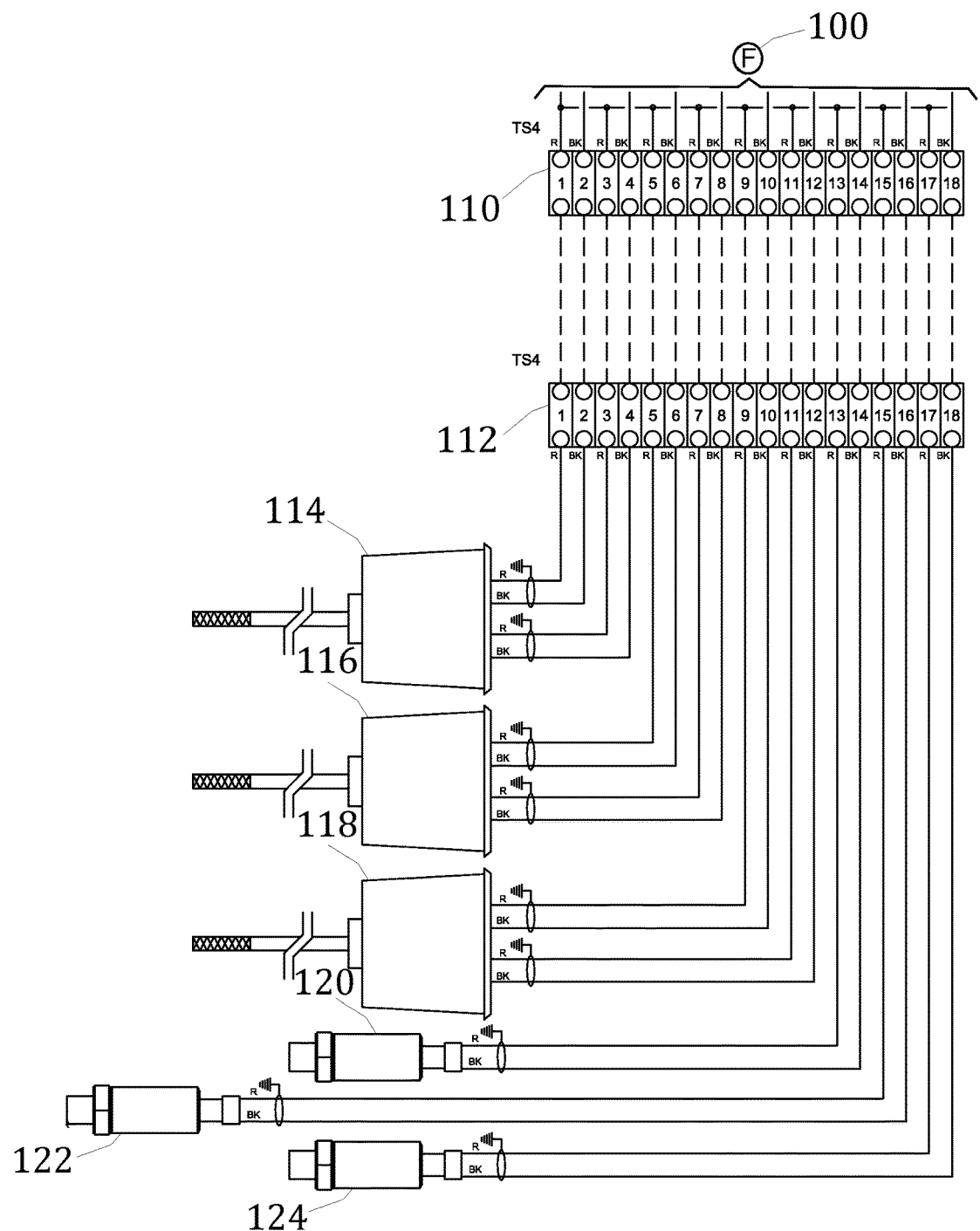

FIG. 2B shows Ethernet cable 34, via identifier D connected to D on FIG. 4C and third terminal block module 72 as previously described.

FIG. 2 shows stage 1 discharge line temperature sensor 94, stage 1 liquid line temperature sensor 96 and stage 1 suction line temperature sensor 98 each connected to strip 92 and in turn connected to terminal block module 88 which is in turn connected via ribbon cable 36 to input module 40. Data from temperature sensors 94, 96 and 98 are communicated by digital signal back to panel 12 and stored in memory.

In similar fashion, supply air humidity/temperature transmitter 114, return air humidity/temperature transmitter 116 and fresh air intake humidity/temperature transmitter 118 are connected lines through strip 112 via identifier F to input modules 46 and 48 for transmission of digital data to panel 12 for further processing.

Figure 2F:
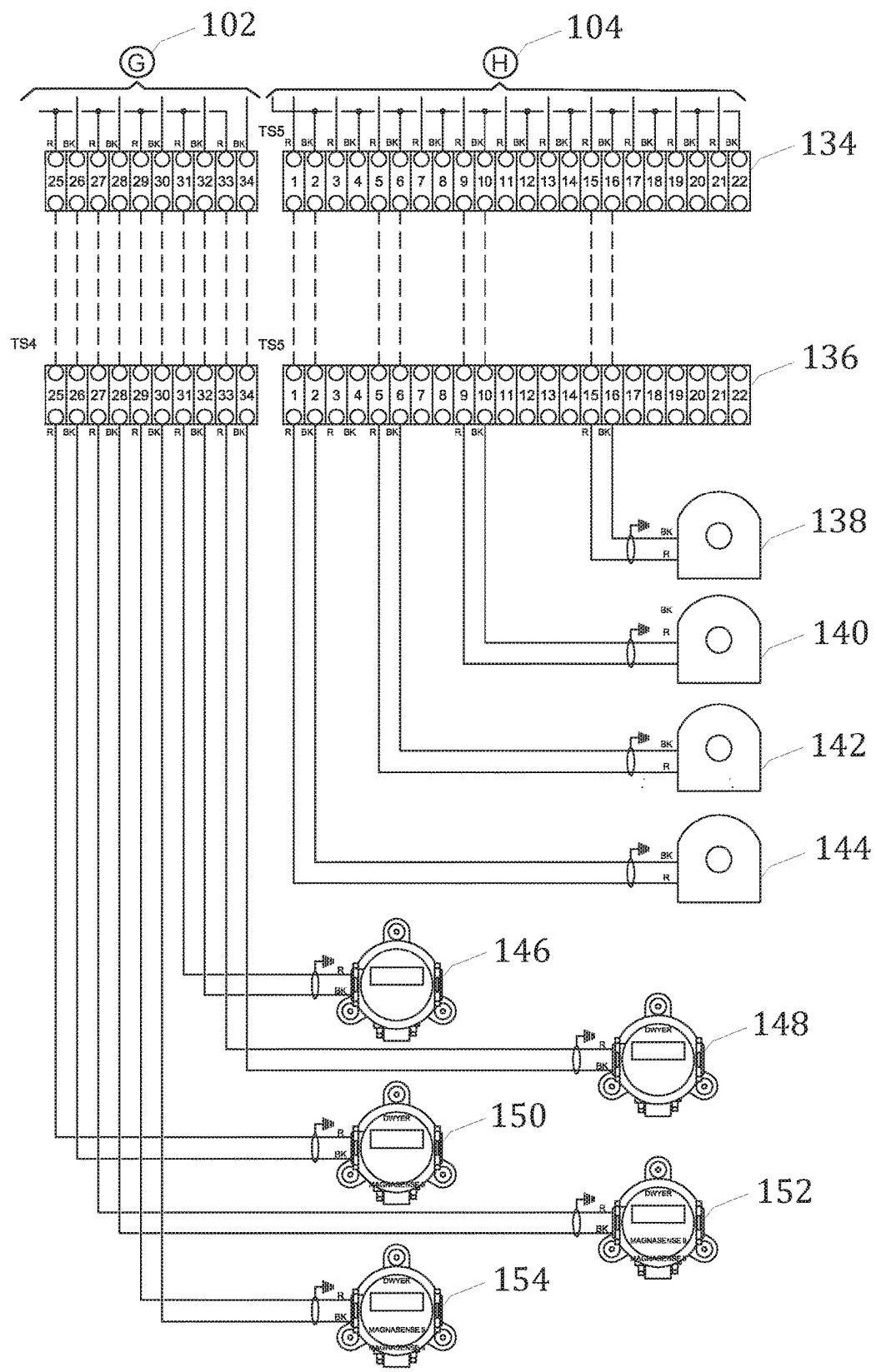

FIG. 2F shows a number of sensors according to a preferred embodiment of the invention. Heater current sensor 138, evaporator motor #1 current 140, condenser motor #1 current 142 and stage 1 compressor current 144 are transmitted via strip 136 and 134 to input modules 52 and 54 for transmission of sensed information to panel 12 as described hereinabove.

Similarly, fresh air post-filter sensor 146, fresh pre-filter sensor 148, building pressure sensor 150, fresh air intake flow sensor 152 and supply air flow sensor 154 are connected to these functions on the HVAC unit to sense and transmit.

Each of the foregoing sensors obtain real time data from the various sensed parameters and deliver via digital signal that data to the processor in panel 12. The data is compared to pre-set data points stored in memory.

Equipment types that may be monitored are set forth in Tables 1A and 1B. Tables 1A and 1B have common first two columns and present data for each of the Equipment Tag Names listed. Table 1 shows a sample instrument list of different manufacturer's products that may be sensed and monitored. Each is provided a unique Tag name which pertains to various characteristics of the system including instrument type, service description, manufacturer, model number, system provided part number, input/output type (which may be discrete or analog), signal type, power supply, certification, HAZLOC, Calibration ranges lo and hi, Engineering units, and other data.

TABLE 1A

| Tag Name | Instrument Type | Service Description | Manufacturer | Model Number | SAS Part # | IO Type | Signal Type | Power Supply |
|---|---|---|---|---|---|---|---|---|
| XS_10001 | N/A | System Shutdown Signal | N/A | N/A | N/A | DI | 24 VDC | 24 VDC |
| XS_10002 | N/A | Evaporator Blower Signal | N/A | N/A | N/A | DI | 24 VDC | 24 VDC |
| XS_10003 | N/A | Stage 1 Cooling Signal | N/A | N/A | N/A | DI | 24 VDC | 24 VDC |
| XS_10004 | N/A | Stage 2 Cooling Signal | N/A | N/A | N/A | DI | 24 VDC | 24 VDC |
| XS_10005 | N/A | Stage 1 Heating Signal | N/A | N/A | N/A | DI | 24 VDC | 24 VDC |
| XS_10006 | N/A | Stage 2 Heating Signal | N/A | N/A | N/A | DI | 24 VDC | 24 VDC |
| XS_10007 | N/A | Stage 1 Condenser Fan Cycle Signal | N/A | N/A | N/A | DI | 24 VDC | 24 VDC |
| XS_10008 | N/A | Stage 2 Condenser Fan Cycle Signal | N/A | N/A | N/A | DI | 24 VDC | 24 VDC |
| XS_10009 | N/A | Pressurization System Enable Signal | N/A | N/A | N/A | DI | 24 VDC | 24 VDC |
| RTD_10010 | RTD | Stage 1 Discharge Line Temperature | Turck | TP-203A-CF-H1141-L100 | 100726 | AI | RTD | N/A |
| RTD_10011 | RTD | Stage 1 Liquid Line Temperature | Turck | TP-203A-CF-H1141-L100 | 100726 | AI | RTD | N/A |
| RTD_10012 | RTD | Stage 1 Suction Line Temperature | Turck | TP-203A-CF-H1141-L100 | 100726 | AI | RTD | N/A |
| RTD_10013 | RTD | Stage 2 Discharge Line Temperature | Turck | TP-203A-CF-H1141-L100 | 100726 | AI | RTD | N/A |
| RTD_10014 | RTD | Stage 2 Liquid Line Temperature | Turck | TP-203A-CF-H1141-L100 | 100726 | AI | RTD | N/A |
| RTD_10015 | RTD | Stage 2 Suction Line Temperature | Turck | TP-203A-CF-H1141-L100 | 100726 | AI | RTD | N/A |
| HT_10016 | Humidity Transmitter | Supply Air Humidity Transmitter | Minco | AH439D 1S20EN T2 | 100831 | AI | 4-20 mA | 24 VDC |
| TT_10017 | Temperature Transmitter | Supply Air Temperature Transmitter | Minco | AH439D 1S20EN T2 | 100831 | AI | 4-20 mA | 24 VDC |
| HT_10018 | Humidity Transmitter | Return Air Humidity Transmitter | Minco | AH439D 1S20EN T2 | 100831 | AI | 4-20 mA | 24 VDC |
| TT_10019 | Temperature Transmitter | Return Air Temperature Transmitter | Minco | AH439D 1S20EN T2 | 100831 | AI | 4-20 mA | 24 VDC |
| HT_10020 | Humidity Transmitter | Fresh Air Intake Humidity Transmitter | Minco | AH439D 1S20EN T2 | 100831 | AI | 4-20 mA | 24 VDC |
| TT_10021 | Temperature Transmitter | Fresh Air Intake Temperature Transmitter | Minco | AH439D 1S20EN T2 | 100831 | AI | 4-20 mA | 24 VDC |
| PT_10022 | Pressure Transmitter | Stage 1 Discharge Line Pressure | Johnson Controls | P499AC P-107K | 109086 | AI | 4-20 mA | 24 VDC |
| PT_10023 | Pressure Transmitter | Stage 1 Liquid Line Pressure | Johnson Controls | P499AC P-107K | 109086 | AI | 4-20 mA | 24 VDC |
| PT_10024 | Pressure Transmitter | Stage 1 Suction Line Pressure | Johnson Controls | P499AC P-107K | 109086 | AI | 4-20 mA | 24 VDC |
| PT_10025 | Pressure Transmitter | Stage 2 Discharge Lane Pressure | Johnson Controls | P499AC P-107K | 109086 | AI | 4-20 mA | 24 VDC |
| PT_10026 | Pressure Transmitter | Stage 2 Liquid Line Pressure | Johnson Controls | P499AC P-107K | 109086 | AI | 4-20 mA | 24 VDC |
| PT_10027 | Pressure Transmitter | Stage 2 Suction Line Pressure | Johnson Controls | P499AC P-107K | 109086 | AI | 4-20 mA | 24 VDC |
| PDT_10028 | Differential Pressure Transmitter | Building Pressure DP | Dwyer | MS2-W102-LCD | 100733 | AI | 4-20 mA | 24 VDC |
| PDT_10029 | Differential Pressure Transmitter | Fresh Air Intake Flow DP | Dwyer | MS2-W102 LCD | 100733 | AI | 4-20 mA | 24 VDC |
| PDT_10030 | Differential Pressure Transmitter | Supply Air Flow DP | Dwyer | MS2-W102-LCD | 100733 | AI | 4-20 mA | 24 VDC |
| PDT_10031 | Differential Pressure Transmitter | Fresh Air Post-Filter DP | Dwyer | MS2-W102-LCD | 100733 | AI | 4-20 mA | 24 VDC |

TABLE 1A-continued

Table One (A)

| Tag Name | Instrument Type | Service Description | Manufacturer | Model Number | SAS Part # | IO Type | Signal Type | Power Supply |
|---|---|---|---|---|---|---|---|---|
| PDT_10032 | Differential Pressure Transmitter | Fresh Air Pre-Filter DP | Dwyer | MS2-W102-LCD | 100733 | AI | 4-20 mA | 24 VDC |
| CT_10033 | Current Transducer | Stage 1 Compressor Current | Dwyer | LTTJ-020 | 100720 | AI | 0-10 VDC | 24 VDC |
| CT_10034 | Current Transducer | Stage 2 Compressor Current | Dwyer | LTTJ-020 | 100720 | AI | 0-10 VDC | 24 VDC |
| CT_10035 | Current Transducer | Condenser Motor #1 Current | Dwyer | LTTJ-020 | 100720 | AI | 0-10 VDC | 24 VDC |
| CT_10036 | Current Transducer | Condenser Motor #2 Current | Dwyer | LTTJ-020 | 100720 | AI | 0-10 VDC | 24 VDC |
| CT_10037 | Current Transducer | Evaporator Motor #1 Current | Dwyer | LTTJ-020 | 100720 | AI | 0-10 VDC | 24 VDC |
| CT_10038 | Current Transducer | Evaporator Motor #2 Current | Dwyer | LTTJ-020 | 100720 | AI | 0-10 VDC | 24 VDC |
| CT_10039 | Current Transducer | Evaporator Motor #3 Current | Dwyer | LTTJ-020 | 100720 | AI | 0-10 VDC | 24 VDC |
| CT_10040 | Current Transducer | Stage 1 Heater Current | Dwyer | LTTJ-020 | 100720 | AI | 0-10 VDC | 24 VDC |
| CT_10041 | Current Transducer | Stage 2 Heater Current | Dwyer | LTTJ-020 | 100720 | AI | 0-10 VDC | 24 VDC |
| CT_10042 | Current Transducer | Pressurization Motor #1 Current | Dwyer | LTTJ-020 | 100720 | AI | 0-10 VDC | 24 VDC |
| CT_10043 | Current Transducer | Pressurization Motor #2 Current | Dwyer | LTTJ-020 | 100720 | AI | 0-10 VDC | 24 VDC |

TABLE 1B

Table One (B)

| Tag Name | Instrument Type | Certification | HAZ-LOC | Calibration Range Lo | Calibration Range Hi | Engineering Units | Rack | Slot | Point |
|---|---|---|---|---|---|---|---|---|---|
| XS_10001 | N/A | N/A | | 0 | 1 | N/A | 1 | 1 | 1 |
| XS_10002 | N/A | N/A | | 0 | 1 | N/A | 1 | 1 | 2 |
| XS_10003 | N/A | N/A | | 0 | 1 | N/A | 1 | 1 | 3 |
| XS_10004 | N/A | N/A | | 0 | 1 | N/A | 1 | 1 | 4 |
| XS_10005 | N/A | N/A | | 0 | 1 | N/A | 1 | 1 | 5 |
| XS_10006 | N/A | N/A | | 0 | 1 | N/A | 1 | 1 | 6 |
| XS_10007 | N/A | N/A | | 0 | 1 | N/A | 1 | 1 | 7 |
| XS_10008 | N/A | N/A | | 0 | 1 | N/A | 1 | 1 | 8 |
| XS_10009 | N/A | N/A | | 0 | 1 | N/A | 1 | 1 | 10 |
| RTD_10010 | RTD | | | −22 | 662 | ° F. | 1 | 3 | 4 |
| RTD_10011 | RTD | | | −22 | 662 | ° F. | 1 | 3 | 5 |
| RTD_10012 | RTD | | | −22 | 662 | ° F. | 1 | 3 | 3 |
| RTD_10013 | RTD | | | −22 | 662 | ° F. | 1 | 3 | 4 |
| RTD_10014 | RTD | | | −22 | 662 | ° F. | 1 | 3 | 5 |
| RTD_10015 | RTD | | | −22 | 662 | ° F. | 1 | 3 | 6 |
| HT_10016 | Humidity Transmitter | | | 0 | 100 | % | 1 | 4 | 1 |
| TT_10017 | Temperature Transmitter | | | −20 | 140 | ° F. | 1 | 4 | 2 |
| HT_10018 | Humidity Transmitter | | | 0 | 100 | % | 1 | 4 | 3 |
| TT_10019 | Temperature Transmitter | | | −20 | 140 | ° F. | 1 | 4 | 4 |
| HT_10020 | Humidity Transmitter | | | 0 | 100 | % | 1 | 4 | 2 |
| TT_10021 | Temperature Transmitter | | | −20 | 140 | ° F. | 1 | 4 | 6 |
| PT_10022 | Pressure Transmitter | CE/UL | CID2 | 0 | 750 | PSI | 1 | 4 | 7 |
| PT_10023 | Pressure Transmitter | CE/UL | CID2 | 0 | 750 | PSI | 1 | 4 | 8 |
| PT_10024 | Pressure Transmitter | CE/UL | CID2 | 0 | 750 | PSI | 1 | 5 | 1 |
| PT_10025 | Pressure Transmitter | CE/UL | CID2 | 0 | 750 | PSI | 1 | 5 | 2 |
| PT_10026 | Pressure Transmitter | CE/UL | CID2 | 0 | 750 | PSI | 1 | 5 | 3 |
| PT_10027 | Pressure Transmitter | CE/UL | CID2 | 0 | 750 | PSI | 1 | 5 | 4 |

TABLE 1B-continued

Table One (B)

| Tag Name | Instrument Type | Certification | HAZ-LOC | Calibration Range Lo | Calibration Range Hi | Engineering Units | Rack | Slot | Point |
|---|---|---|---|---|---|---|---|---|---|
| PDT_10028 | Differential Pressure Transmitter | CE | | 0 | 1250 | Pascals | 1 | 5 | 5 |
| PDT_10029 | Differential Pressure Transmitter | CE | | 0 | 1250 | Pascals | 1 | 5 | 6 |
| PDT_10030 | Differential Pressure Transmitter | CE | | 0 | 1250 | Pascals | 1 | 5 | 7 |
| PDT_10031 | Differential Pressure Transmitter | CE | | 0 | 1250 | Pascals | 1 | 5 | 8 |
| PDT_10032 | Differential Pressure Transmitter | CE | | 0 | 1250 | Pascals | 1 | 6 | 1 |
| CT_10033 | Current Transducer | | | 0 | 100 | Amperes | 1 | 7 | 1 |
| CT_10034 | Current Transducer | | | 0 | 100 | Amperes | 1 | 7 | 2 |
| CT_10035 | Current Transducer | | | 0 | 100 | Amperes | 1 | 7 | 3 |
| CT_10036 | Current Transducer | | | 0 | 100 | Amperes | 1 | 7 | 4 |
| CT_10037 | Current Transducer | | | 0 | 100 | Amperes | 1 | 7 | 5 |
| CT_10038 | Current Transducer | | | 0 | 100 | Amperes | 1 | 7 | 6 |
| CT_10039 | Current Transducer | | | 0 | 100 | Amperes | 1 | 7 | 7 |
| CT_10040 | Current Transducer | | | 0 | 100 | Amperes | 1 | 7 | 8 |
| CT_10041 | Current Transducer | | | 0 | 100 | Amperes | 1 | 7 | 1 |
| CT_10042 | Current Transducer | | | 0 | 100 | Amperes | 1 | 7 | 2 |
| CT_10043 | Current Transducer | | | 0 | 100 | Amperes | 1 | 7 | 3 |

Each of the sensors identified in FIG. 2, may have various set points and acceptable ranges. These set points and ranges are relatable to one or more Events which the system generates for troubleshooting. Table 2 sets forth a list of sensors, acceptable parameter rates in Hi SP and Lo SP columns and Events that pertain to those sensed parameters.

TABLE 2

| Item Description | IO Type | Signal Type | Power Supply | Engineering Units | Hi SP | Lo SP | Events |
|---|---|---|---|---|---|---|---|
| Calculated Superheat | N/A | Calc | N/A | °F. | 20 | 10 | 1-6, 9-14 |
| Calculated Subcooling | N/A | Calc | N/A | °F. | 20 | 10 | 1-4, 7-12, 15, 16 |
| Compressor Current (Note 1) | AI | 4-20 mA | 24 VDC | % AMPERES | 125 | 25 | 17, 18 |
| Condenser/Evaporator/ Purge Motor Current (Note 2) | AI | 4-20 mA | 24 VDC | % AMPERES | 90 | 25 | 19-23, 26, 27 |
| Heater Current (Note 3) | AI | 4-20 mA | 24 VDC | % AMPERES | 125 | 75 | 24, 25 |
| Room/Building/Shelter/ Enclosure/Cabinet Pressure | AI | 4-20 mA | 24 VDC | IWC | 0.25 | 0.1 | 30 |
| Room/Building/Shelter/ Enclosure/Cabinet Temperature | AI | 4-20 mA | 24 VDC | °F. | 85 | 55 | 31, 77 |
| Discharge Air Temperature | AI | 4-20 mA | 24 VDC | °F. | 192 | N/A | 32 |
| Incoming Voltage (Note 4) | AI | 4-20 mA | 24 VDC | % VOLTS | 110 | 90 | 33, 73-76 |
| Contactor Cycle Limit | N/A | Calc | N/A | COUNTS | 100000 | N/A | 40-50 |
| Pre-Filter Differential Pressure | AI | 4-20 mA | 24 VDC | IWC | 0.2 | N/A | 78 |
| Post-Filter Differential Pressure | AI | 4-20 mA | 24 VDC | IWC | 0.2 | N/A | 79 |

TABLE 2-continued

| Item Description | IO Type | Signal Type | Power Supply | Engineering Units | Hi SP | Lo SP | Events |
| --- | --- | --- | --- | --- | --- | --- | --- |
| Discharge Refrigerant Pressure (Note 5) | AI | 4-20 mA | 24 VDC | PSI | 575 | N/A | 34, 35 |
| Suction Refrigerant Pressure (Note 6) | AI | 4-20 mA | 24 VDC | PSI | N/A | 20 | 36, 37 |
| Fresh Air Flow (NOTE 7) | AI | 4-20 mA | 24 VDC | % CFM | 120 | 80 | 28 |
| Discharge Air Flow (NOTE 8) | AI | 4-20 mA | 24 VDC | % CFM | 120 | 80 | 29 |

(Note 1):
COMPRESSOR CURRENT ALARM SETPOINTS ARE EXPRESSED AS A PERCENTAGE OF COMPRESSOR'S RATED RUN LOAD AMPS (RLA).
(Note 2):
MOTOR CURRENT ALARM SETPOINTS ARE EXPRESSED AS A PERCENTAGE OF MOTOR'S RATED FULL LOAD AMPS (FLA).
(Note 3):
HEATER CURRENT ALARM SETPOINTS ARE EXPRESSED AS A PERCENTAGE OF HEATER'S CALCULATED CURRENT BASED ON ITS RATED WATTAGE.
(Note 4):
VOLTAGE ALARM SETPOINTS ARE EXPRESSED AS A PERCENTAGE OF RATED SYSTEM VOLTAGE.
(Note 5):
DISCHARGE LINE PRESSURE ALARM SETPOINTS ARE DIFFERENT FOR EACH REFRIGERANT TYPE.
Table 2
(Note 5):
SUCTION LINE PRESSURE ALARM SETPOINTS ARE DIFFERENT FOR EACH REFRIGERANT TYPE.
(NOTE 7):
FRESH AIR FLOW RATE IS DEPENDENT ON SYSTEM DESIGN PURGE AND/OR BUILDING LEAKAGE REQUIREMENTS.
(NOTE 8):
DISCHARGE AIR FLOW RATE IS DEPENDENT ON REFRIGERATION TONNAGE.

So for example, compressor current set points are shown as a percentage of the compressor's rated run load in amperes. Each item that is being sensed has high and low parameters that when triggered feed information into the processor to determine which of the Events are occurring. For example, Heater Current is expressed in amperes and if it deviates from the acceptable range by 125% or 75%, it will produce a display of Event 24 or 25 depending on additional data. Then Event 24 will display on the screen and provide the user with troubleshooting information.

FIGS. 3 through 10 show troubleshooting information displays for various events that may be monitored by the system of the preferred embodiment of the invention. Various sensing parameters will be processed into individual actionable events for the purpose of ease of interpretation and maintenance. For example, in FIG. 3A, Event 01 is a tag name given to the event description—"Stage 1 high superheat and low subcool detected," which is computed from suction and liquid line pressures and temperatures. Each event is similarly provided a unique tag for processing by the PLC and system.

For each event, a preventive maintenance alert and/or troubleshooting guide is provided as exemplified below FIGS. 3 through 10.

Monitoring/Alarm Functions are provided to analyze Airflow/Pressure. Using analog data from airflow and pressure sensors allows for the following to be monitored: dirty filter monitoring; dirty coil monitoring (indicated by refrigerant pressures); statement of unit performance; total delivered tons (calculated); total delivered CFM to conditioned space (measured); total return air CFM (calculated); total fresh air CFM (measured); and the number of air changes per hour (requires user input of building parameters).

In a preferred embodiment, motor ON/OFF and current transducers are provided. These permit monitoring of the motor current using a CT (single leg) of all motor driven components and allows for display of all components that are on and off; the motor current using a CT (single leg) of all motor driven components and a relay on the contactor can display an alarm if the motor is called for, but not engaged; the motor current using a CT (single leg) of all motor driven components can determine the ON/OFF status and allows for run timers to be established for each component which can trigger maintenance activities (such as greasing motors or PM checks); the motor current using a CT (single leg) of all motor driven components can determine the run status and establishes the number of starts on the component which can trigger maintenance activities (i.e. excessive motor or compressor starts per hour or contactor life); and the motor current using a CT (single leg) of all motor driven components can allow for comparison against nameplate FLA vs. actual running current. When a component draws more amps than FLA plus service factor, a maintenance activity will be triggered.

The Refrigerant System is monitored by monitoring the pressure and temperature of refrigerant charge which allows for the calculation and display of each system's superheat and subcool to indicate refrigeration system health and allow for scheduled maintenance and, if necessary, shutdown for repair if a leak is found. Superheat and subcool levels will be displayed and alarms generated on out of range conditions. For example, high refrigerant discharge pressures can indicate condenser blockage, condenser fan problems, or dirty condenser coil; low refrigerant suction pressures can indicate evaporator blockage, evaporator fan problems, coil icing, dirty return air filter, or dirty evaporator coil.

The Heater System may be monitored by monitoring the current draw of one leg of the heater wiring and the discharge temperature. The unit's incoming voltage can also allow for the display of each heater stage status and total delivered heating kW to the space.

General Performance can be monitored by measuring the temperature and RH of the conditioned space and allows for the display of the unit's general performance and can trigger alarms when temperatures and RH are out of range. Table 2 shows a list of typical parameters and the set points being measured against. For each parameter being sensed, there are set points of a preferred operating range as shown in Table 2. If the processor detects a sensed data that is different than pre-determined settings, it enters that data into the PLC to determine if it alone, or in combination with other sensed signals, triggers an event. For example, certain events are the result of a deviation from two sensor readings. Event 1 is triggered by a sensor reading of the calculated superheat being too high or low and the calculated subcooling being too high or low as set forth in Table 2. In other situations, Event 34 is triggered by the discharge refrigerant pressure being out of a pre-determined range.

Data Gathering/Processing and Sensor Data Gathering may be monitored as well.

The sensor data shall be gathered into a single PLC. The PLC will gather all analog and digital sensor data and process it into useful data.

Sensor Processing is accomplished with a PLC program shall be written to take raw data and establish the following:

Filter Δp monitoring and dirty filter alarm levels;
Calculated Return Airflow with alarm (low and high);
Fresh Air Airflow with alarm (low and high);
Discharge/Supply Airflow with alarm (low and high);
Number of Air Changes calculation with alarm (low and high);
Supply Air Pressure with alarm level (high);
Room Pressure with alarm level (low and high);
Run time for each component with PM levels after established threshold has been met;
Number of ON/OFF cycles for each contactor component with PM levels after established threshold has been met;
Motor current display with alarm levels based on RLA or FLA (plus service factor) input;
Refrigerant system superheat and subcool calculation and display with alarm levels (high and low);
Iced/Blocked/Dirty Coil alarms based on refrigerant pressures;
Heat system ON/OFF with unit voltage and heater current to calculate actual delivered kW to space; and
Temperature sensor reporting and calculation of actual delivered capacity in kW, Btu/Hr and tons.

Alarms shall be established when delivered air temperatures are out of range.

Local Human Machine Interface "HMI" Display may have the following displays:

Filter Δp gauges with red zones for alarm levels and dirty filter alarm ON/OFF;
Return Airflow Gauge with red zones for alarm levels and low return air alarm ON/OFF;
Fresh Air Airflow Gauge with red zones for alarm levels (low and high) and low and high alarms;
Discharge/Supply Airflow Gauge with red zones for alarm levels (low and high) and low and high alarms;
Number of Air Changes display with alarm level for low and high number of air changes;
Room Pressure gauge with red zone for high and low levels with high and low alarm indicators;
Run time display for each component with PM level indicators;
Number of ON/OFF cycles display for each component with PM levels indicator. Alarm displayed if any motor/heater contactor is called for, but not engaged;
Motor current draw display for each motor and with high alarm level indicator;
Refrigerant system superheat and subcool display with high and low alarm levels;
Refrigerant system gauges with out of range indicators (iced, blocked or dirty coil);
Heat system ON/OFF display with total current display and display of actual delivered kW. Alarm displayed if heater contactor is called for, but not engaged;
Temperature reading displays with normal alarm levels of out of range values. Display of actual delivered capacity in kW, Btu/Hr and/or tons;
Trending display for all sensors;
Historical display of all sensors up to a pre-determined time period; and
Alarm log for all alarms and preventive maintenance alerts.

In certain cases, the system processor will analyze trending data and check against pre-determined set points for activation of Event and troubleshooting or maintenance instructions. For example, if the system aggregates data showing a temperature sensor reading downward over a specified period of time, it may indicate a potential problem and based on that trend, the processor will match to a pre-determined event and generate an appropriate display for resolution.

FIGS. 3 through 10 show a number of Events triggered by various combinations of sensed data from the various sensors employed in the system. Each Event listing is stored in memory and tied to a set of instructions or troubleshooting guides that responds to alarms and provides maintenance advice when various factors reach certain milestones or otherwise trigger an Event. When the Event occurs, it matches the stored instructions with one or more sensed data readings to display the Event and troubleshooting guide for the user to review and execute. A particular Event may have several solutions or a series of solutions that may be tried one after the other to solve the problem.

Each Event is identified by Title, Possible Causes, and Recommended Solutions to generate a display of the particular Event in response to the pre-determined set points in comparison to the sensed data.

For example, as shown in FIG. 10H, Event 98 illustrates a continuous trend analysis, while the amperage has not exceeded limits, the uptrend demonstrate a deteriorating motor and we recommend action before failure. Event 99 illustrates a frequent occurrence within a specified amount of time. In this case, frequent voltage irregularities call for either a source fix, or a power quality enhancement on the load side. Event 100 illustrates a comparison of two identical and redundant units serving a common air conditioned space. One operating at lower efficiency than the other calls for maintenance checks. Event 101 illustrates a timed preventive maintenance event even in the absence of a sensor variance, recommended for continued smooth operation.

Certain Events may be triggered for maintenance purposes before an actual problem arises. In this case, sensor variances or trends may be analyzed against pre-determined points and matched to a display of an Event. Similarly, maintenance events may be triggered based on run time independent of any sensed data or trends and appropriate display triggered for the user. As previously discussed, Events may be configured for any of a variety of sensors and conditions with appropriate troubleshooting or maintenance solutions stored in memory for retrieval and display to a user.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the later filed claims.

The invention claimed is:

1. A computer implemented method for monitoring operational conditions of a heating ventilation and air conditioning (HVAC) unit and providing preventive maintenance alerts and/or troubleshooting instructions using an ordered set of causes for sensed parameters comprising the steps of:
monitoring one or more operational parameters of the HVAC unit with a plurality of sensors;
collecting real time operational information from the sensors in a data acquisition device and transmitting the data to a storage device;
analyzing the real time data with a processor and comparing it to a list of pre-determined data set points stored in memory pertaining to one or more of the parameters to determine variances from the data set points and identification of one or more pre-determined maintenance alerts and/or trouble events associated with one or more of the variances;
matching a set of preventative maintenance alerts and troubleshooting instructions stored in the storage device pertaining to the events to at least one of the events;
displaying the instructions to a user for resolving the event in a descending order determined by the processor of the most likely causes along with an associated solution for each cause; and
providing a pre-failure solution from the stored set of instructions based on analysis of the stored data and timed sensor values.

2. The method according to claim 1, wherein each portion of the operational information is directed to a specific operational parameter of the asset.

3. The method according to claim 1, wherein the processor analyzes the stored data with trending analysis and failure prediction based on a timed sensed value trend and provides a pre-failure solution from the stored set of instructions.

4. The method according to claim 1, further comprising storage of a set of timed recommended preventive maintenance activities for the HVAC unit and maintenance activity log for reference and record.

5. The method according to claim 1, wherein matching of the instructions to the sensed parameters is stored in a programmable logic array.

6. The method according to claim 1, wherein the predetermined data set points are based on a percentage deviation from a known quantity.

7. The method according to claim 1, wherein the sensed parameters include real time preventive maintenance and troubleshooting monitoring.

8. A computer implemented method for monitoring operational conditions of a machine and troubleshooting using an ordered set of causes for sensed parameters comprising:
sensing one or more operational parameters of the machine;
collecting real time operational information from the sensors over a network and transmitting the data to a storage and processing device;
analyzing with a processor the real time data and comparing it to a list of preferred data set points pertaining to each of the parameters to determine variances from the data set points and identification of one or more events associated with one or more of the variances;
matching a set of preventative maintenance alerts and troubleshooting instructions stored in a storage device pertaining to the events to the troubleshooting instructions for at least one of the events;
displaying a pre-failure solution from the stored set of instructions based on a trending analysis of the variances from the data set points based on a timed sensor value trend.

9. The method of claim 8, wherein each of the portion of the operational information is directed to a respective one of the plurality of operational parameters.

10. The method of claim 8, further comprising receiving user input based on the preventive maintenance alerts and/or troubleshooting displays.

11. The method according to claim 8, wherein the plurality of sensors include at least one from the group comprising measuring temperature, pressure, humidity, airflow, voltage, unit cooling capacity and current.

12. The method according to claim 8, further comprising developing a preventive maintenance alerts and/or troubleshooting display list associated with the machine and enabling user input to the machine for configuration of the machine.

13. The method according to claim 8, wherein the analyzing is based in part on calculating life expectancy of a component.

14. The method according to claim 8 further comprising an alarm and/or event that activates when a deviation is determined to exist from the predetermined set points.

15. A system for monitoring operational conditions of a heating ventilation and air conditioning (HVAC) unit and providing preventative maintenance alerts and/or troubleshooting instructions using an ordered set of causes for sensed conditions comprising:
a plurality of sensors, including at least one from the group comprising pressure, temperature, humidity, air flow, voltage, machine capacity, and current provided to monitor one or more operational parameters of the HVAC unit;
a data acquisition device comprises a processor for collecting real time operational information from the sensors and transmitting the data to a storage device;
the processor using a programmable logic array for analyzing the real time data and comparing it to a set of pre-determined data points pertaining to one or more of the parameters to determine variances from pre-determined values and identification of at least one preventative maintenance or troubleshooting event associated with one or more of the variances;
a set of preventative maintenance alerts and/or troubleshooting instructions stored in the storage device pertaining to the events;
the processor for matching one of the preventative maintenance alerts and/or troubleshooting instructions to at least one of the events;
an alert to a user of one of the instructions at a time, rotating through a set of instructions for each event in an order determined by the processor showing the most likely cause to the least likely cause of the event along with associated solutions for each cause; and
wherein the processor analyzes the stored data with trending analysis and failure prediction based on a timed sensor value trend and provides a pre-failure solution from the stored set of instructions.

16. The system according to claim 15 comprising a supervisory system comprising:

a plurality of data acquisition and storage devices for collection and storage of real time operational information from the sensors of multiple heating ventilation and air conditioning (HVAC) units;

the processor for analyzing real time data from multiple HVAC units and comparing it to a list of pre-determined data set points pertaining to one or more of the parameters from one or more units to determine variances from pre-determined values and identification of one or more preventive maintenance and/or troubleshooting events associated with one or more of the variances;

a display of stored data on various compatible display devices;

the processor for analyzing the pre-determined data with trending analysis and failure prediction based on timed sensor value trend and displaying the identified event to a user to provide a pre-failure solution from the stored events;

a combined log stored in memory of maintenance alerts and troubleshooting events; and the combined log of maintenance and troubleshooting activities stored in memory for reference and record by the user.

17. The system according to claim 15, wherein the pre-determined data set points are based on a percentage deviation from a known quantity.

18. The system according to claim 15, wherein the preventative maintenance alert comprises prediction of component failure.

19. The system according to claim 15, further comprising selective interconnection with multiple display devices.

20. The system according to claim 15, wherein the pre-determined data set points are based on a percentage deviation from a known quantity.

* * * * *